(12) United States Patent
Sankaran et al.

(10) Patent No.: US 9,448,776 B1
(45) Date of Patent: Sep. 20, 2016

(54) METHOD AND APPARATUS FOR CONVERTING A WEBSITE INTO A NATIVE MOBILE APPLICATION

(71) Applicant: AppNotch LLC, St. Louis, MO (US)

(72) Inventors: Lakshmanan Sankaran, St. Louis, MO (US); Russell Lee Bockhorst, Troy, MO (US); Ken Spear Adriano, St. Ann, MO (US)

(73) Assignee: APPNOTCH LLC, St. Louis, MO (US)

( * ) Notice: Subject to any disclaimer, the term of this patent is extended or adjusted under 35 U.S.C. 154(b) by 0 days.

(21) Appl. No.: 14/990,703

(22) Filed: Jan. 7, 2016

Related U.S. Application Data

(60) Provisional application No. 62/101,337, filed on Jan. 8, 2015.

(51) Int. Cl.
*G06F 15/16* (2006.01)
*G06F 17/28* (2006.01)
*G06F 9/45* (2006.01)
*G06F 17/30* (2006.01)

(52) U.S. Cl.
CPC ........... *G06F 8/41* (2013.01); *G06F 17/30893* (2013.01)

(58) Field of Classification Search
CPC ..................... G06F 17/30905; G06F 17/2247; G06F 17/30893; G06F 9/45516; G06F 9/44526; G06F 8/41; G06F 17/289; H04L 67/02
See application file for complete search history.

(56) References Cited

U.S. PATENT DOCUMENTS

| | | | |
|---|---|---|---|
| 6,779,042 B1 | 8/2004 | Kloba et al. | |
| 7,200,809 B1 | 4/2007 | Paul et al. | |
| 7,509,649 B2 | 3/2009 | Shenfield | |
| 7,548,915 B2 | 6/2009 | Ramer et al. | |
| 7,721,278 B2* | 5/2010 | Alam | G06F 9/44521 717/131 |
| 7,797,432 B2* | 9/2010 | Volodarsky | H04L 67/14 707/999.107 |
| 7,840,647 B2 | 11/2010 | Kloba et al. | |
| 7,899,847 B2 | 3/2011 | Lau et al. | |
| 7,937,261 B2* | 5/2011 | Wang | G06F 17/289 704/2 |
| 7,966,408 B2 | 6/2011 | Schramm et al. | |
| 7,987,420 B1 | 7/2011 | Kloba et al. | |
| 8,073,895 B2 | 12/2011 | Hamzeh et al. | |
| 8,412,767 B2 | 4/2013 | Ho et al. | |
| 8,595,186 B1 | 11/2013 | Mandyam et al. | |
| 8,615,712 B2 | 12/2013 | Porter et al. | |
| 8,635,522 B2 | 1/2014 | Lee et al. | |
| 8,656,353 B2 | 2/2014 | Brendza et al. | |
| 8,788,935 B1 | 7/2014 | Hirsch et al. | |
| 8,813,028 B2 | 8/2014 | Farooqi | |
| 8,832,644 B2 | 9/2014 | Hirsch et al. | |
| 8,875,095 B2 | 10/2014 | Hirsch et al. | |
| 8,898,629 B2 | 11/2014 | Hirsch et al. | |

(Continued)

OTHER PUBLICATIONS

Charland et al., Mobile Application Development: Web vs. Native, Apr. 2011, 9 pages.*

(Continued)

*Primary Examiner* — Thuy Dao
(74) *Attorney, Agent, or Firm* — Thompson Coburn LLP; Benjamin L. Volk, Jr.

(57) ABSTRACT

Disclosed herein are a number of embodiments for effective and user-friendly tools that are designed to automatically convert a website into a native app for execution by a mobile computing device such as an Android device or an iOS device. Such tools permit website owners to quickly generate native apps for their websites without the need for any significant programming efforts by app developers.

30 Claims, 18 Drawing Sheets

(56) References Cited

U.S. PATENT DOCUMENTS

| | | | |
|---|---|---|---|
| 8,898,630 B2 | 11/2014 | Hirsch et al. | |
| 8,918,712 B2 | 12/2014 | Nario et al. | |
| 8,978,006 B2 | 3/2015 | Hirsch et al. | |
| 9,069,759 B2* | 6/2015 | Shoshan | G06F 17/289 |
| 9,146,909 B2* | 9/2015 | Khorashadi | G06F 17/30905 |
| 9,176,754 B2* | 11/2015 | Kokkevis | G06F 9/44526 |
| 2004/0148571 A1 | 7/2004 | Lue | |
| 2004/0209607 A1 | 10/2004 | Stepanich et al. | |
| 2009/0044259 A1* | 2/2009 | Bookman | H04L 63/0428 726/5 |
| 2010/0169761 A1 | 7/2010 | Lee et al. | |
| 2010/0174974 A1 | 7/2010 | Brisebois et al. | |
| 2010/0199197 A1 | 8/2010 | Faletski et al. | |
| 2010/0281475 A1 | 11/2010 | Jain et al. | |
| 2011/0083069 A1 | 4/2011 | Paul et al. | |
| 2011/0287750 A1 | 11/2011 | Watanabe et al. | |
| 2012/0017146 A1* | 1/2012 | Travieso | G06F 17/2827 715/265 |
| 2012/0047425 A1 | 2/2012 | Ahmed | |
| 2012/0060087 A1 | 3/2012 | Jame et al. | |
| 2012/0137211 A1 | 5/2012 | Lewontin | |
| 2012/0159310 A1* | 6/2012 | Chang | G06F 8/40 715/239 |
| 2012/0180073 A1 | 7/2012 | Hung | |
| 2012/0216108 A1 | 8/2012 | Yambal et al. | |
| 2013/0024873 A1* | 1/2013 | Hillier | G06F 9/54 719/313 |
| 2013/0036399 A1 | 2/2013 | Anderson | |
| 2013/0152066 A1 | 6/2013 | Fernandez-Ruiz et al. | |
| 2013/0152067 A1 | 6/2013 | Fernandez-Ruiz et al. | |
| 2013/0205196 A1 | 8/2013 | Han et al. | |
| 2013/0212559 A1 | 8/2013 | Lehtimki et al. | |
| 2013/0219429 A1 | 8/2013 | Hirsch et al. | |
| 2013/0283305 A1 | 10/2013 | Hirsch et al. | |
| 2013/0305218 A1 | 11/2013 | Hirsch et al. | |
| 2013/0311984 A1 | 11/2013 | Kaiwar | |
| 2013/0326333 A1 | 12/2013 | Hashmi | |
| 2014/0089786 A1 | 3/2014 | Hashmi | |
| 2014/0101635 A1 | 4/2014 | Hoffmann | |
| 2014/0136945 A1 | 5/2014 | Ligman et al. | |
| 2014/0136954 A1 | 5/2014 | Ligman et al. | |
| 2014/0136955 A1 | 5/2014 | Lee et al. | |
| 2014/0143172 A1 | 5/2014 | Richter et al. | |
| 2014/0143654 A1 | 5/2014 | Yang et al. | |
| 2014/0143656 A1 | 5/2014 | Porter et al. | |
| 2014/0215446 A1 | 7/2014 | Araya et al. | |
| 2014/0258816 A1* | 9/2014 | Xiong | G06F 17/30905 715/201 |
| 2014/0280743 A1 | 9/2014 | Burckart et al. | |
| 2014/0280770 A1 | 9/2014 | Burckart et al. | |
| 2014/0281859 A1 | 9/2014 | Burckart et al. | |
| 2014/0281863 A1 | 9/2014 | Burckart et al. | |
| 2014/0281881 A1 | 9/2014 | Burckart et al. | |
| 2014/0281883 A1 | 9/2014 | Burckart et al. | |
| 2014/0281884 A1 | 9/2014 | Burckart et al. | |
| 2014/0281886 A1 | 9/2014 | Hirsch et al. | |
| 2014/0281904 A1 | 9/2014 | Burckart et al. | |
| 2014/0281905 A1 | 9/2014 | Burckart et al. | |
| 2014/0281906 A1 | 9/2014 | Burckart et al. | |
| 2014/0282371 A1 | 9/2014 | Hirsch et al. | |
| 2014/0344837 A1* | 11/2014 | Sharoni | G06F 9/44526 719/328 |
| 2014/0351684 A1 | 11/2014 | Smit et al. | |
| 2014/0365869 A1 | 12/2014 | Warila et al. | |
| 2015/0012908 A1 | 1/2015 | Farooqi | |
| 2015/0121193 A1* | 4/2015 | Beveridge | G06F 17/30893 715/234 |
| 2015/0212990 A1* | 7/2015 | Tseng | G06F 9/4443 715/234 |

OTHER PUBLICATIONS

Byalik et al., Native-2-native: automated cross-platform code synthesis from web-based programming resources, Oct. 2015, 10 pages.*

David, "Converting Websites into Native Apps using PhoneGap", HTML5 Mobile Websites, 2012, pp. 173-207, Article 5, Elsevier, Inc.

PhoneGap FAQs retreived from http://phonegap.com/about/faq on Mar. 6, 2015.

* cited by examiner

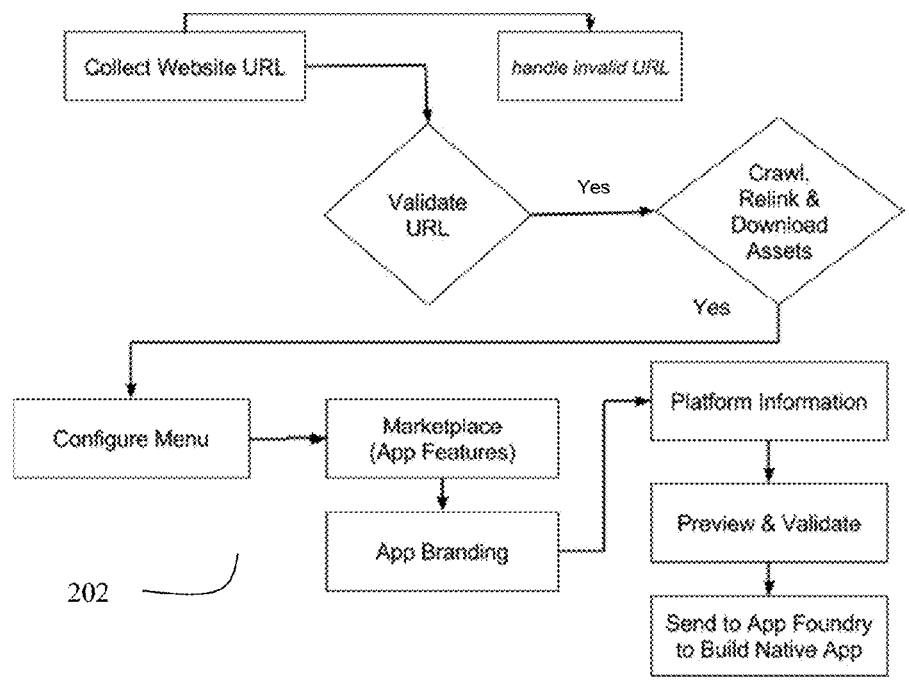
Figure 3
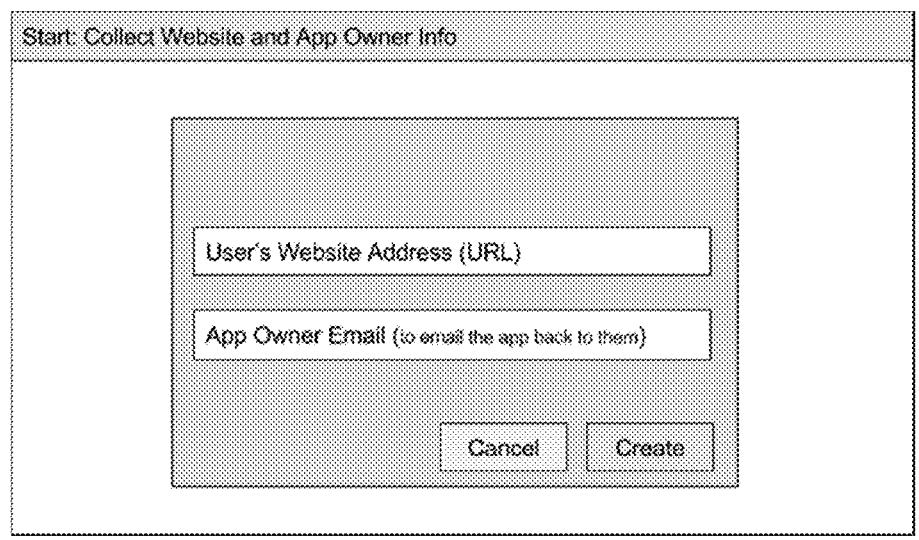
Figure 4: Web Foundry: Fetch Website and App Owner Info.

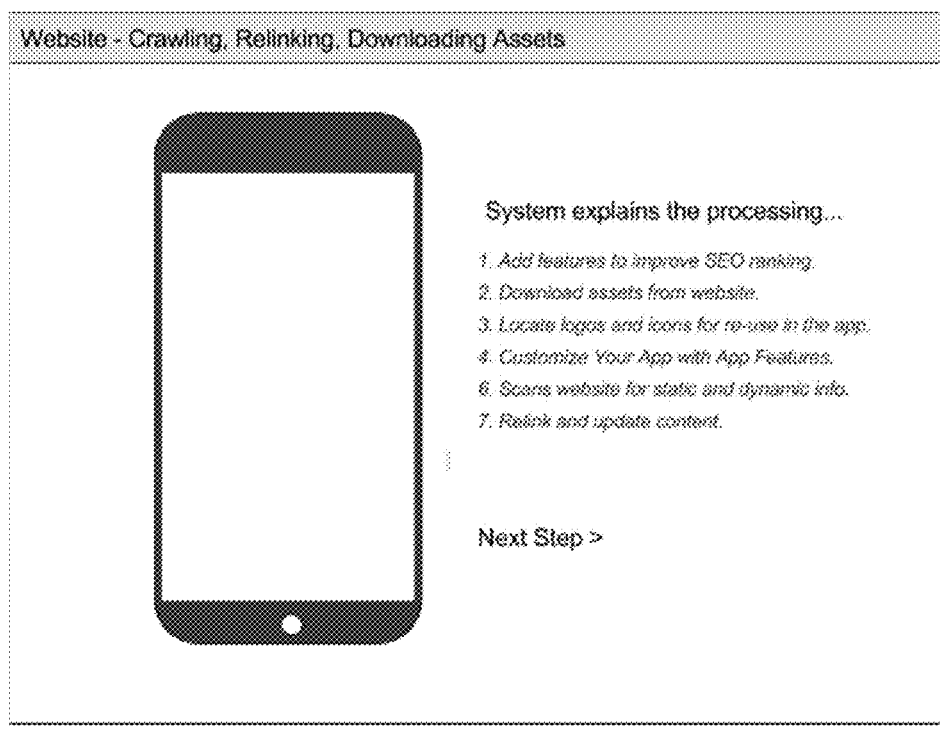
Figure 5: Web Foundry: Crawl, Relink, Download Assets.

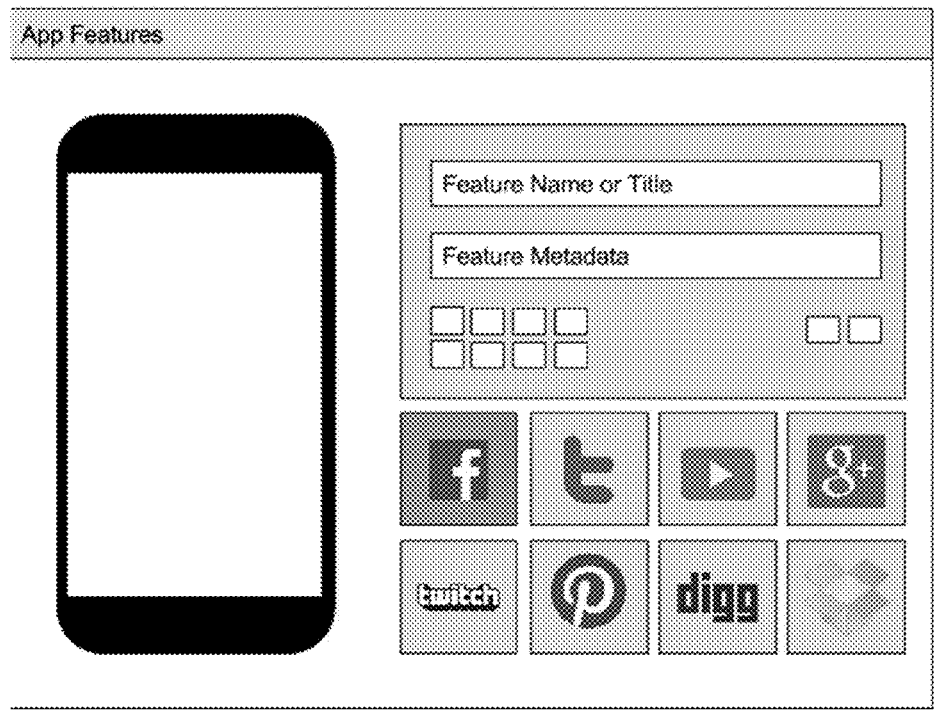
Figure 6: Web Foundry: App Features.
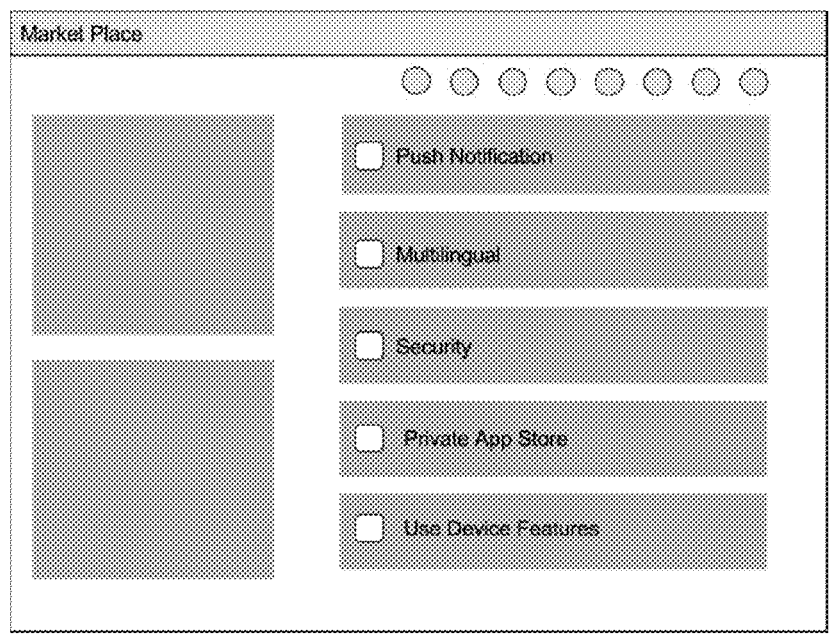
Figure 7: Web Foundry: Market Place.

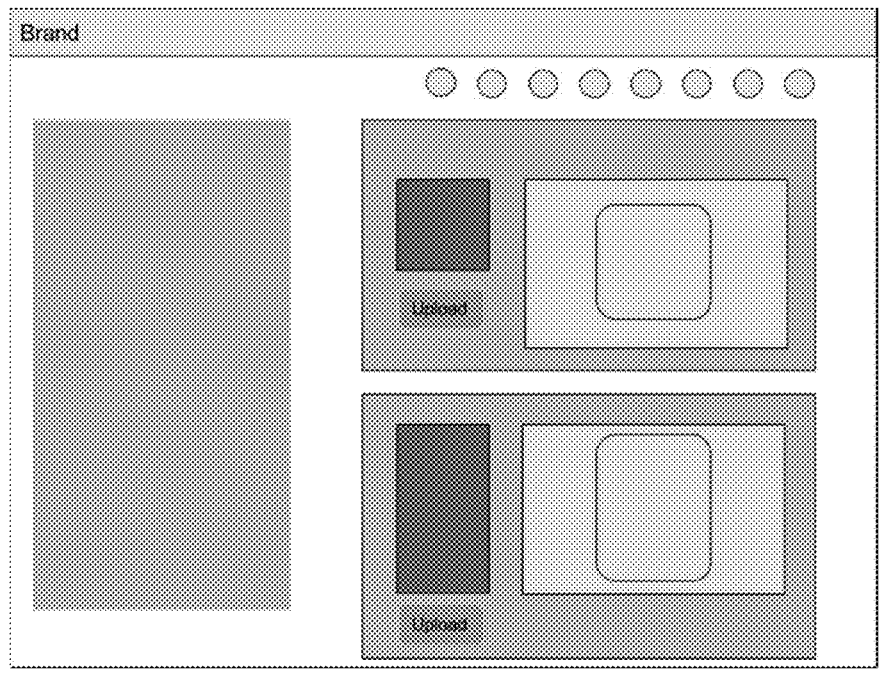
Figure 8: Web Foundry: App Branding.
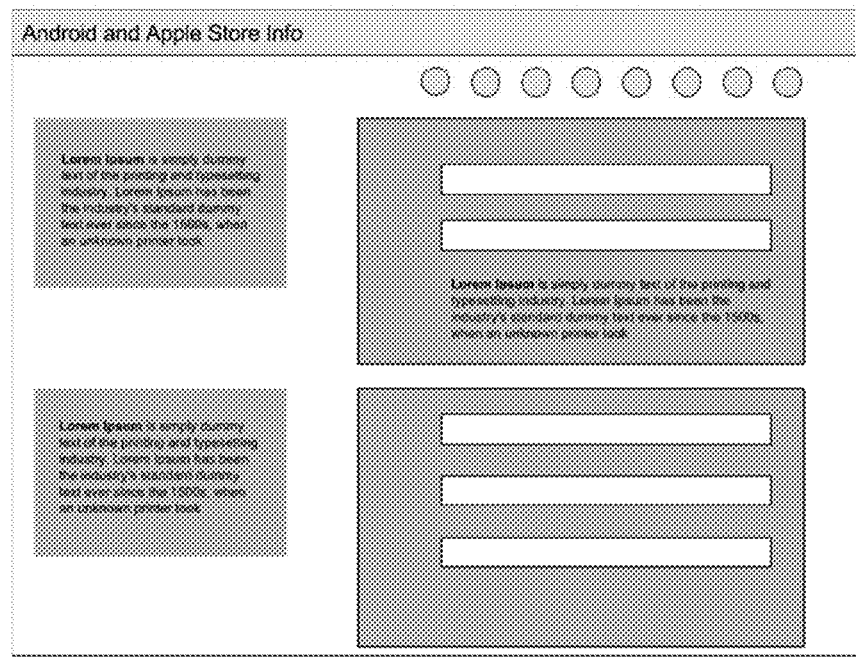
Figure 9: Web Foundry: App Store Info.

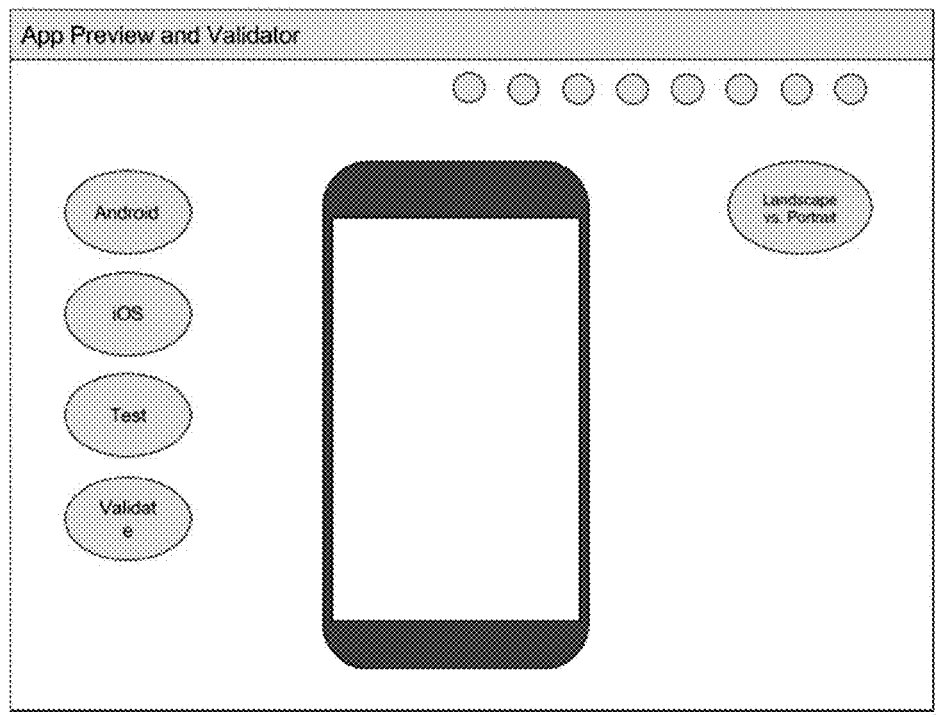
Figure 10: Web Foundry: App Preview and Validator.
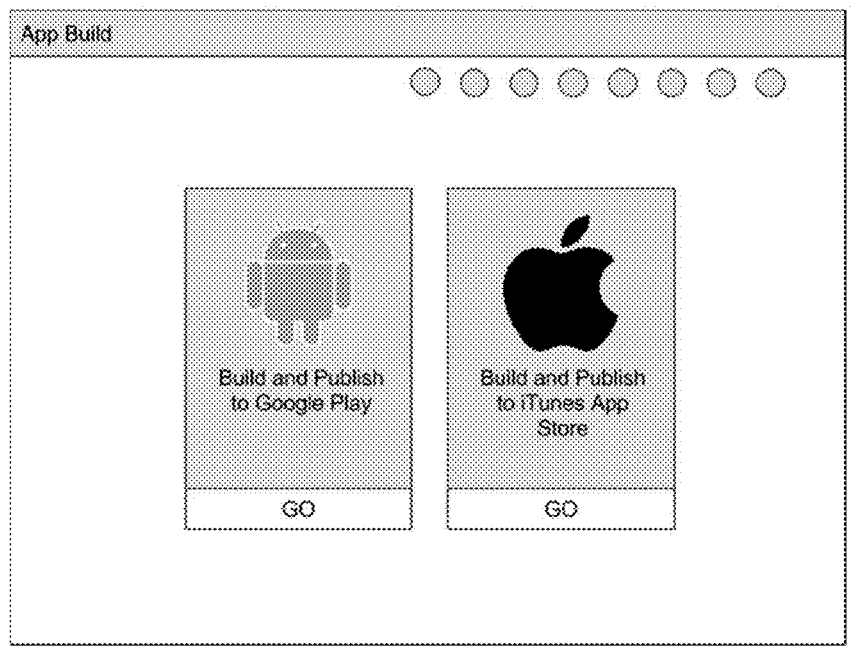
Figure 11: Web Foundry: App Build.

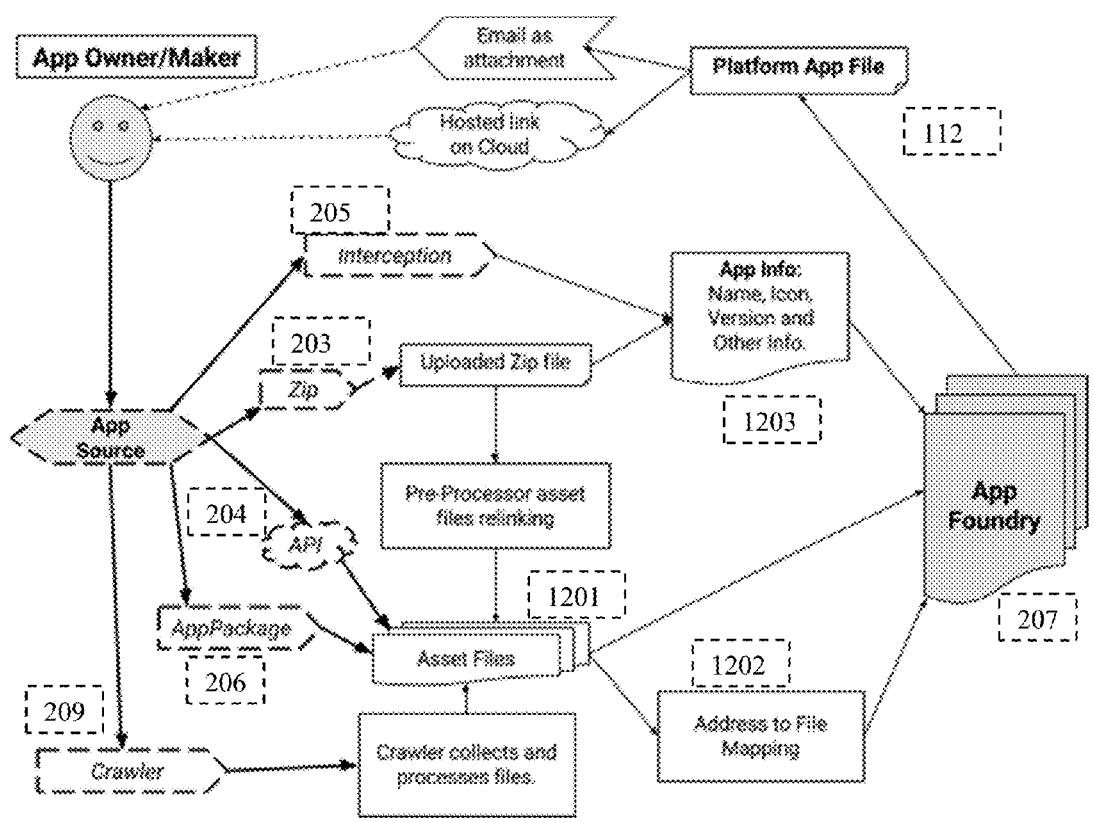
Figure 12: Overview of how Web Foundry and App Foundry interconnect.

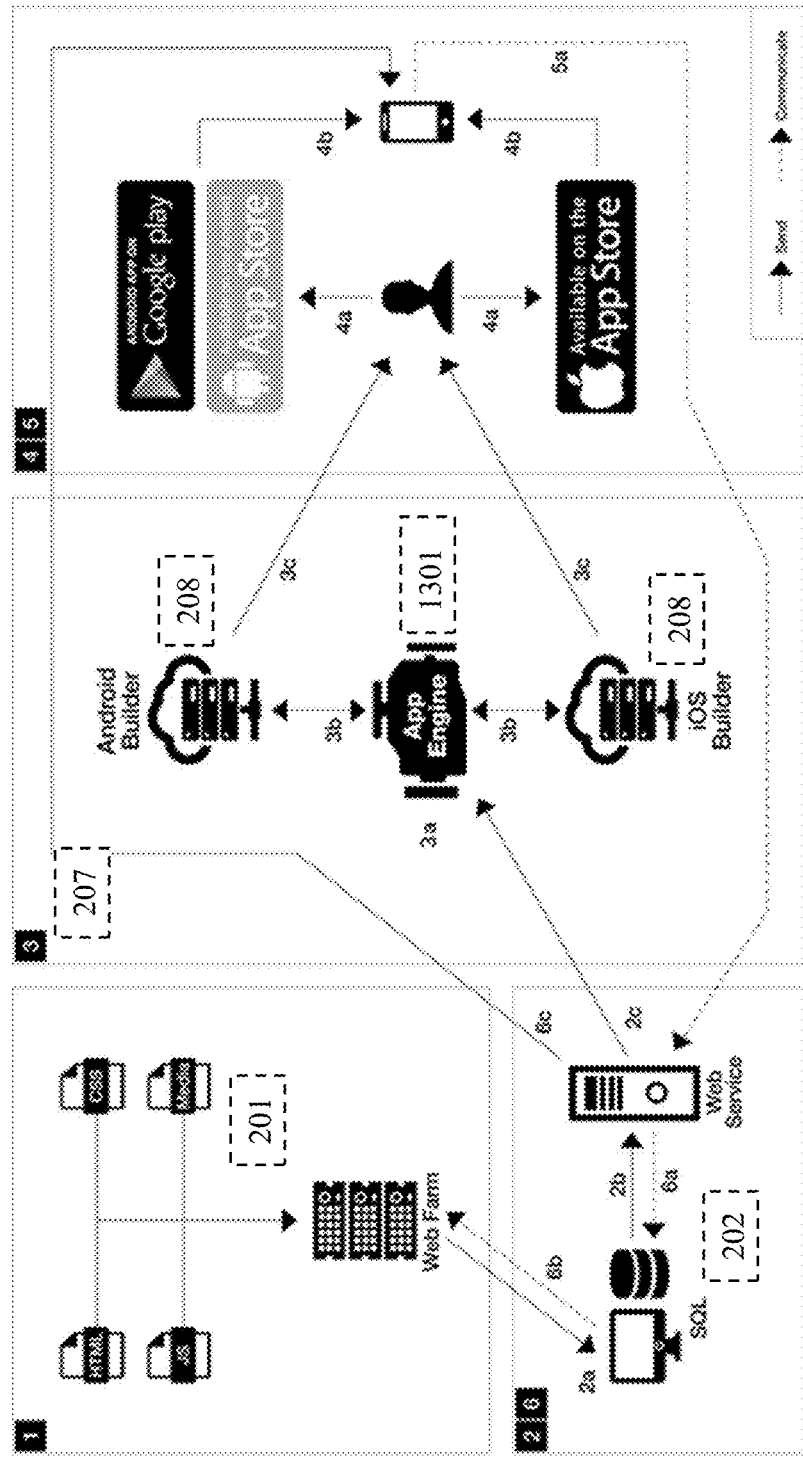
Figure 13: Overview of Parser (Crawler or Scraper) based website to native app conversion.

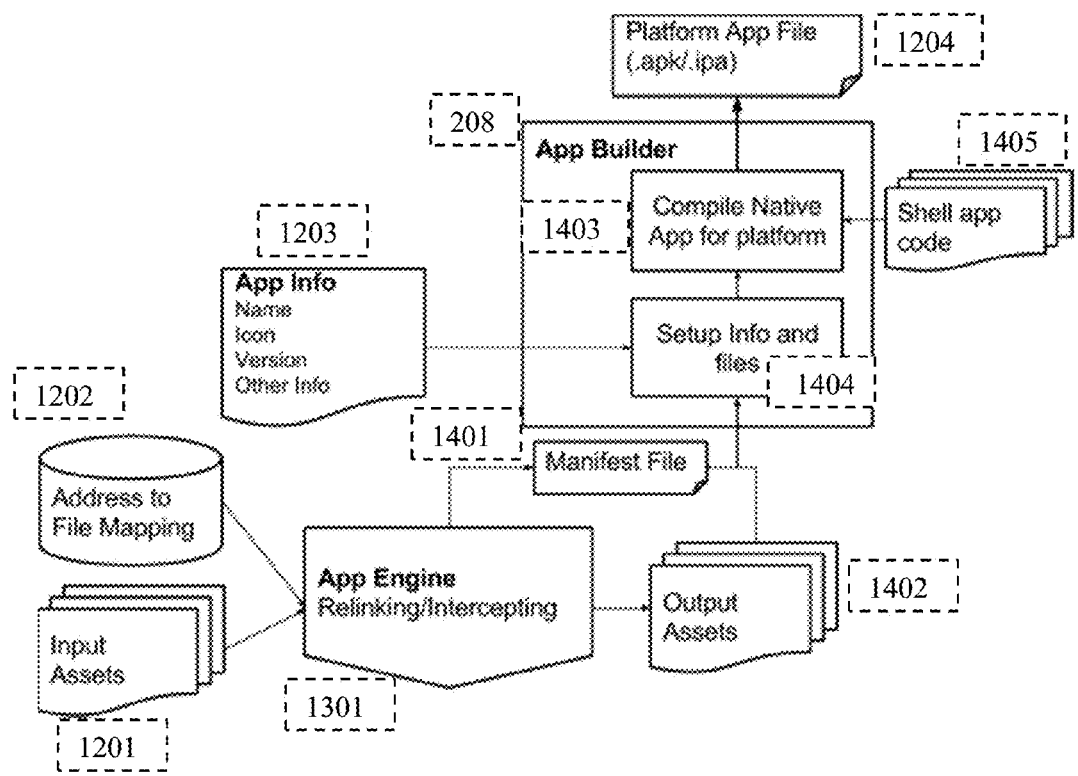
Figure 14: App Foundry
```
<appInfo>
    <name>Sample App</name>
    <version>1.0.0</version>
    <identifier>com.sample.app</identifier>
    ...
</appInfo>
```
Figure 15: App Info Example.

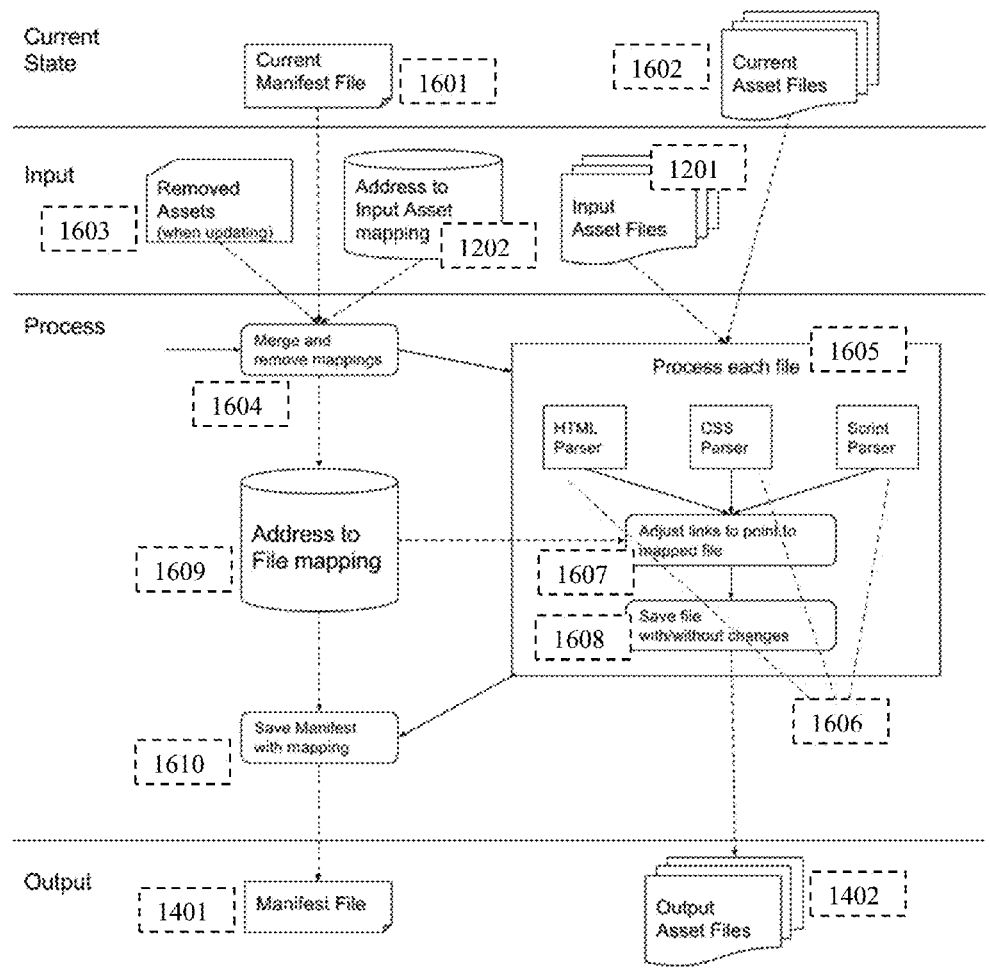
Figure 16: Relinking App Engine.

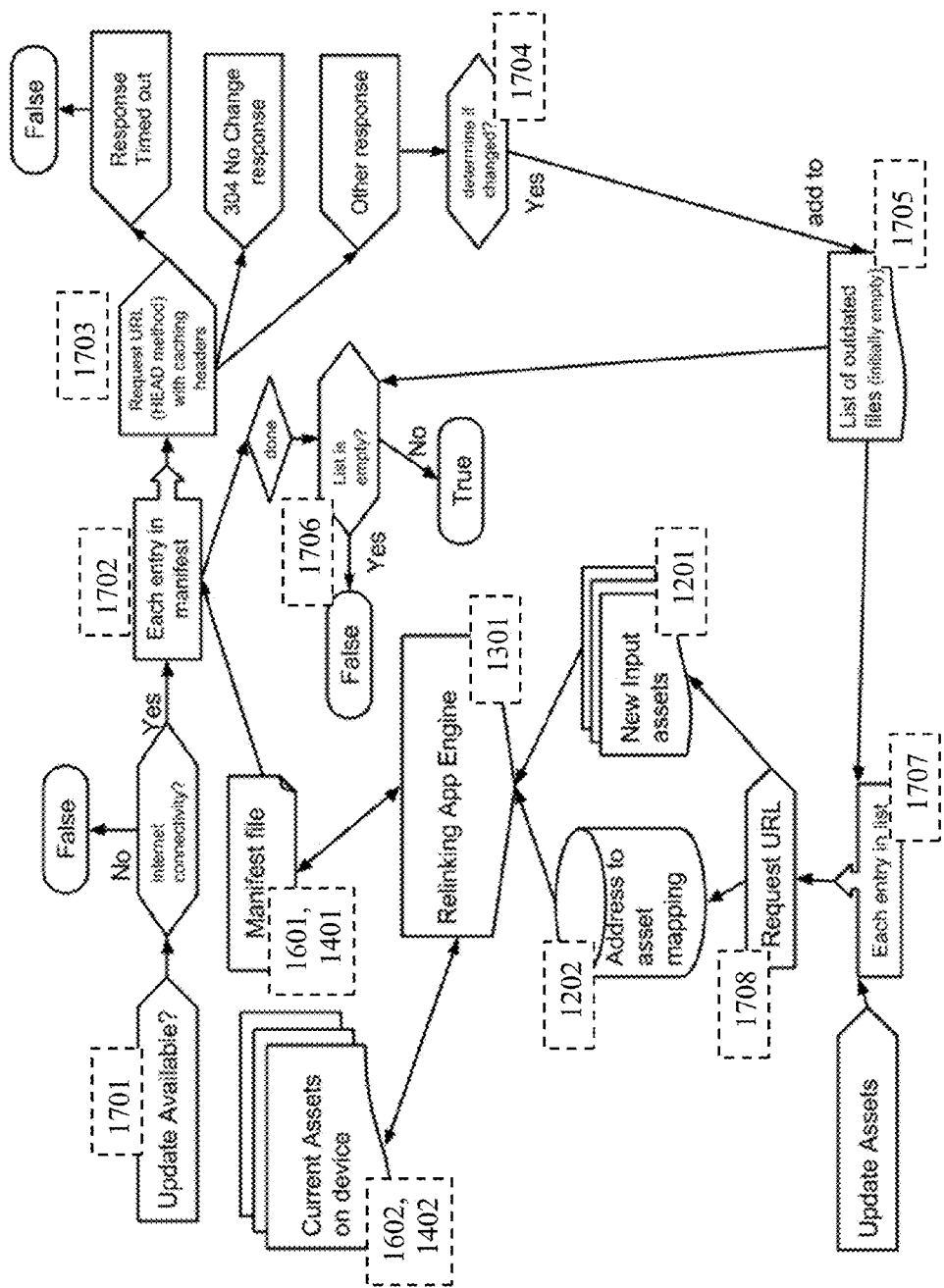
Figure 17: Option 1 - App Internal Update

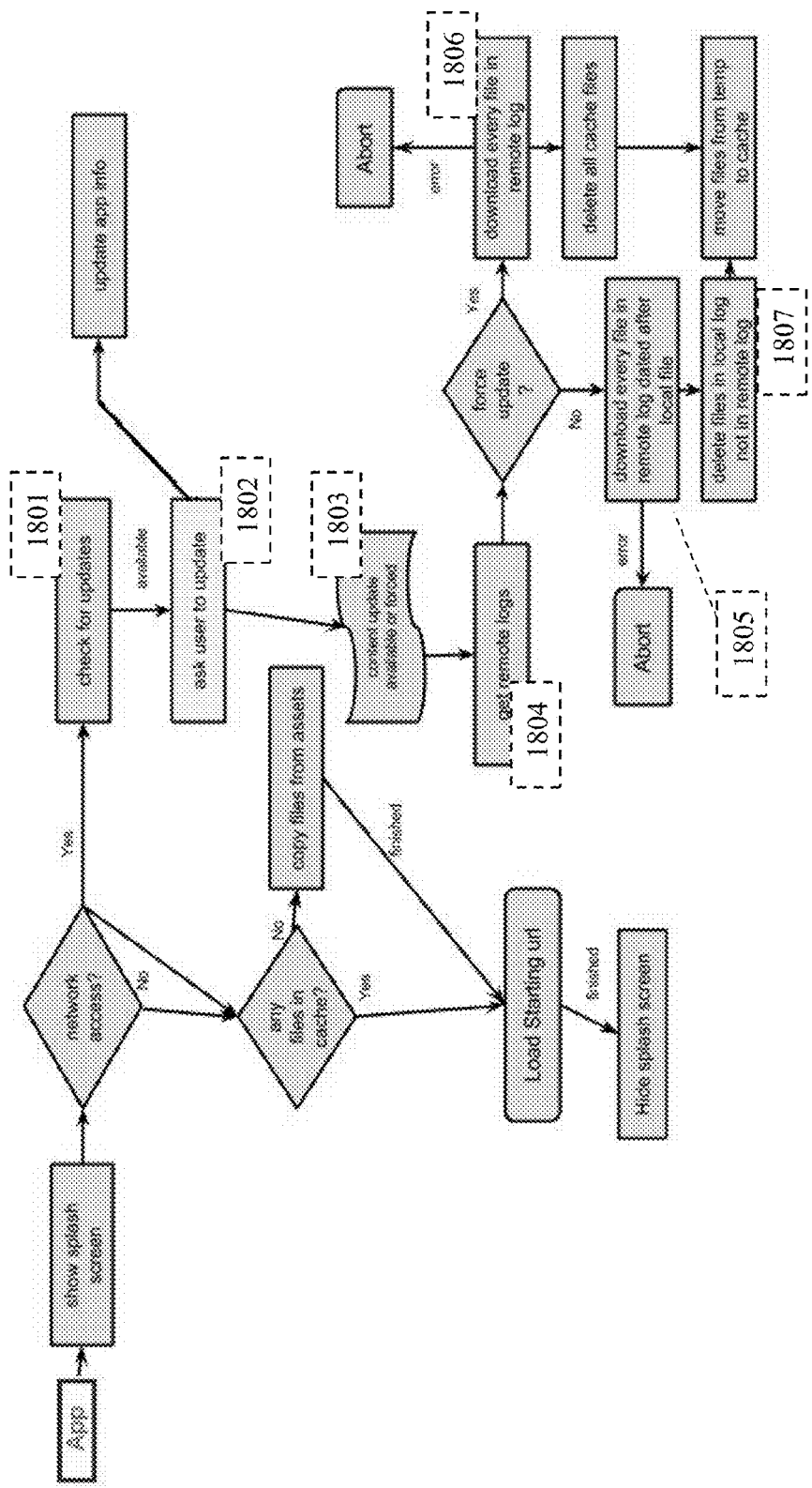
Figure 18: Option 2 - App External Update.

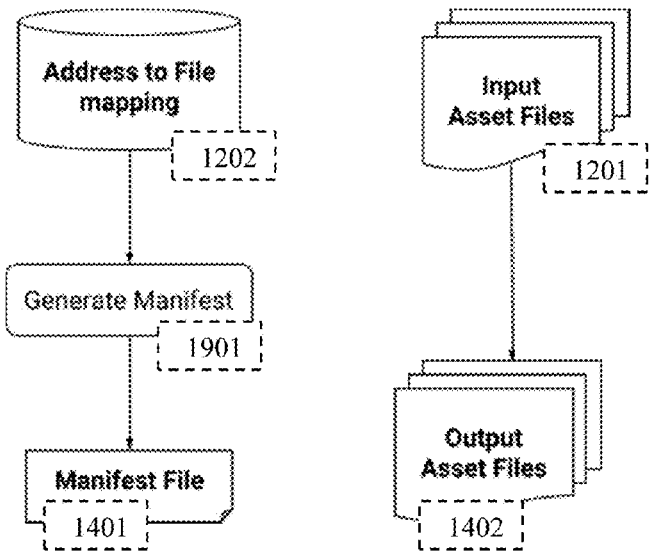
Figure 19: Intercepting App Engine.
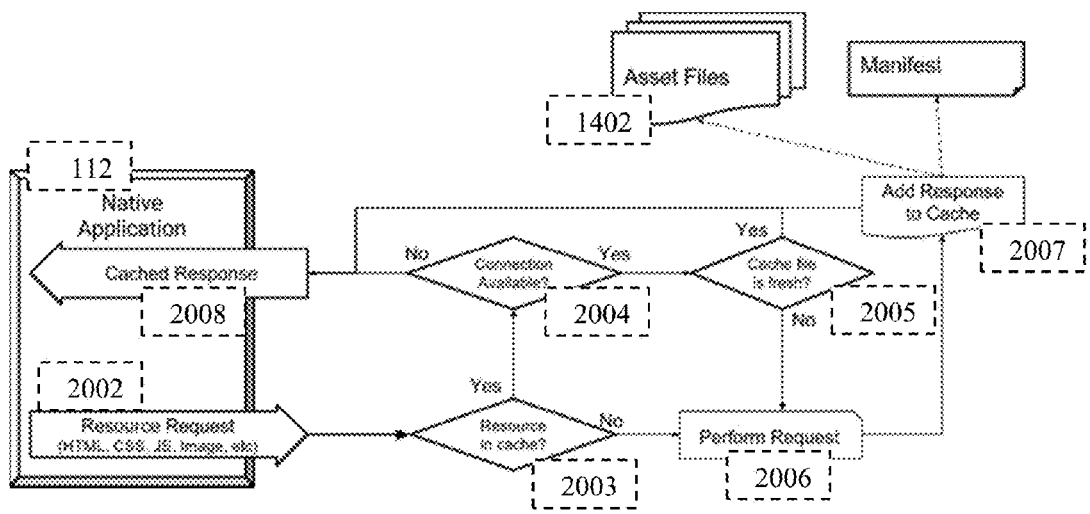
Figure 20: Intercepting Model - App Content Update

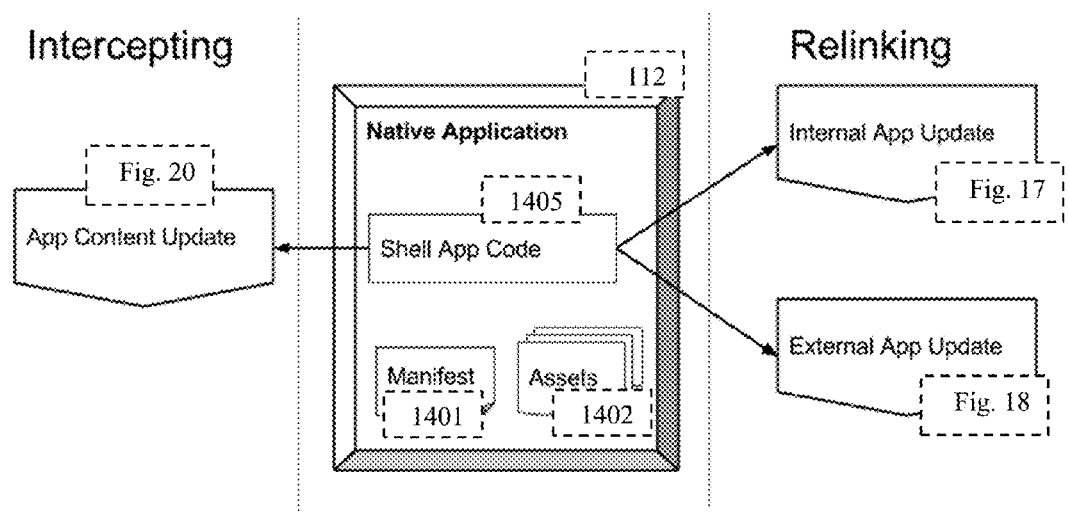
Figure 21: Native Application and Shell App Code

| Original Website | Relinked Version |
|---|---|
| URL: somesite.com/page1.html | File: page1.html |
| ```html
<html>
<head>
    <title>Page 1</title>
    <link rel="stylesheet" href="/css/style.css">
    <script src="/js/script.js"></script>
</head>
<body>
    <div class="box">
    <ul>
        <li><a href="page2.html">Page 2</a></li>
        <li><a href="folder/page3.html">Page 3</a></li>
        <li><a href="https://www.google.com/">Google</a></li>
    </ul>
    </div>
</body>
</html>
``` | ```html
<html>
<head>
    <title>Page 1</title>
    <link rel="stylesheet" href="css/style.css">
    <script src="js/script.js"></script>
</head>
<body>
    <div class="box">
    <ul>
        <li><a href="page2.html">Page 2</a></li>
        <li><a href="folder/page3.html">Page 3</a></li>
        <li><a href="https://www.google.com/">Google</a></li>
    </ul>
    </div>
</body>
</html>
``` |
| URL: somesite.com/page2.html | File: page2.html |
| ```html
<html>
<head>
    <title>Page 2</title>
    <link rel="stylesheet" href="/css/style.css">
    <script src="/js/script.js"></script>
</head>
<body>
    <a href="javascript:my_func()">
      <img src="/img/image1.png">
    </a>
    <div class="box">
    <ul>
        <li><a href="/folder/page3.html">Page 3</a></li>
    </ul>
    </div>
</body>
</html>
``` | ```html
<html>
<head>
    <title>Page 2</title>
    <link rel="stylesheet" href="css/style.css">
    <script src="js/script.js"></script>
</head>
<body>
    <a href="javascript:my_func()">
      <img src="img/image1.png">
    </a>
    <div class="box">
    <ul>
        <li><a href="folder/page3.html">Page 3</a></li>
    </ul>
    </div>
</body>
</html>
``` |

Figure 22A: Example Website Relinked Asset

| Original Website | Relinked Version |
|---|---|
| URL: somesite.com/folder/page3.html<br>`<html>`<br>`<head>`<br>    `<title>Page 3</title>`<br>    `<link rel="stylesheet" href="/css/style.css">`<br>    `<script src="/js/script.js"></script>`<br>`</head>`<br>`<body>`<br>  `<a href="/page1.html">`<br>    `<img src="/img/image1.png">`<br>  `</a>`<br>  `<div class="box">`<br>    `<ul>`<br>      `<li><a href="../page2.html">Page 2</a></li>`<br>    `</ul>`<br>  `</div>`<br>`</body>`<br>`</html>` | File: folder/page3.html<br>`<html>`<br>`<head>`<br>    `<title>Page 3</title>`<br>    `<link rel="stylesheet" href="../css/style.css">`<br>    `<script src="../js/script.js"></script>`<br>`</head>`<br>`<body>`<br>  `<a href="../page1.html">`<br>    `<img src="../img/image1.png">`<br>  `</a>`<br>  `<div class="box">`<br>    `<ul>`<br>      `<li><a href="../page2.html">Page 2</a></li>`<br>    `</ul>`<br>  `</div>`<br>`</body>`<br>`</html>` |
| URL: somesite.com/js/script.js<br><br>function my_func()<br>{<br>    window.location.href = "/page1.html";<br>} | File: js/script.js<br><br>function my_func()<br>{<br>    window.location.href = "page1.html";<br>} |

Figure 22B: Example Website Relinked Asset

```
<manifest>
    <originalUrl>http://somesite.com/page1.html</originalUrl>
    <startUrl>file://output/page1.html</startUrl>
    <dateCreated>2015-06-26T16:58:11.1601613Z</dateCreated>
    <fileData path="page1.html" url="http://somesite.com/page1.html">
        <dateRetrieved>2015-07-20T22:03:46.577462Z</dateRetrieved>
        <header name="Date" value="Mon, 20 Jul 2015 22:03:46 GMT" />
        <header ... />
    </fileData>
    <fileData path="page2.html" url="http://somesite.com/page2.html">
        <dateRetrieved>2015-07-20T22:03:47.423462Z</dateRetrieved>
        <header name="Date" value="Mon, 20 Jul 2015 22:03:47 GMT" />
        <header ... />
    </fileData>
    <fileData ....
</manifest>
```

Figure 23: Manifest Example

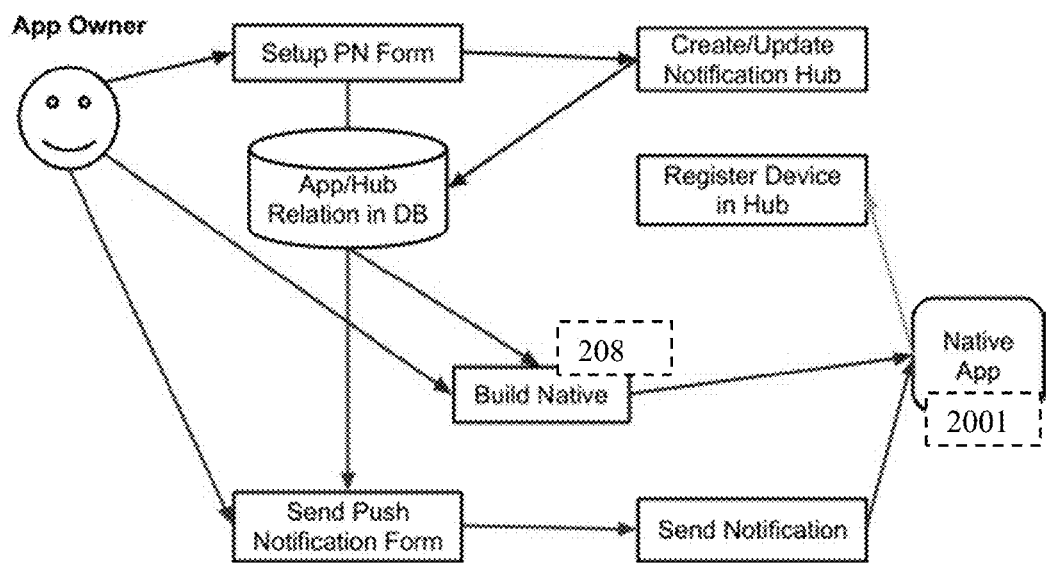
Figure 24: Push Notification.

METHOD AND APPARATUS FOR CONVERTING A WEBSITE INTO A NATIVE MOBILE APPLICATION

CROSS-REFERENCE AND PRIORITY CLAIM TO RELATED PATENT APPLICATION

This patent application claims priority to U.S. provisional patent application 62/101,337, entitled "Method and Apparatus for Converting a Website into a Native Mobile Application", filed Jan. 8, 2015, the entire disclosure of which is incorporated herein by reference.

INTRODUCTION

With the ubiquity of mobile computing devices such as smart phones and tablet computers, many people use mobile applications ("apps", or "mobile apps") executed by their mobile computing devices to electronically access information and/or services ("content").

While apps are widespread, much more widespread are websites. However, given the growth in usage of apps, many website owners have a desire to make website content available to users via apps to add an additional channel for engaging users as well as potentially sell native apps to the public via App Stores.

Website owners have faced a challenge in this regard because the creation of an app is technically challenging and historically has required a website owner to either code new apps themselves for one or more mobile application platforms or hire a software developer to code such apps. As used herein, an app refers to a mobile application that is executed by a mobile computing device. Apps typically vary as a function of which underlying mobile computing device platform they execute on. For example, the same functionality for an app would be coded differently for execution on an iOS platform (e.g., an Apple iPhone, iPad, iTouch, etc.) than on an Android platform (e.g., an Android-compatible smart phone). The term "native app" (or equivalently, "native application", "native mobile app", or "native mobile application") is used herein to refer to a mobile application program that has been designed and configured for use on a particular mobile computing device platform. The term "native app" does not encompass a general browser program on a mobile computing device that is configured to access websites (including mobile versions of websites) via a network such as the Internet.

As a solution to this problem, the inventor discloses techniques by which a website can be automatically converted into a native app that can be loaded onto a mobile computing device for execution thereby. Example embodiments for methods, apparatuses, systems, and computer program products that perform these website-to-native app conversion techniques are described below.

There are several problems and technical challenges that example embodiments disclosed herein solve. For example, app development typically requires custom coding for each app by a technical person with advanced programming skills and who has a solid working knowledge of Java, Android SDK, Apple Xcode and Objective C (or Swift) can develop an Android and/or iOS app. With example embodiments of the invention, however, anyone can convert any static website and/or dynamic website built using HTML, CSS, or other web framework or tools into a native app and host it in either or both Android and Apple app stores (or a private app store such that might be available within a company) for free or paid download.

With conventional methods, in order to build a native iOS app, a developer would need access to an Apple Mac system and development tools, along with a yearly subscription to Apple's iOS developer program. With example embodiments of the invention, however, a person is able to create a native iOS app without acquiring or having access to a Mac system and other iOS development tools.

Moreover, after developing a native app in the conventional manner, developers have to spend an additional time testing their app in different devices and various form-factors for usability. By contrast, with aspects of example embodiments of the invention, operating system and form-factor validation can be pre-built into a native app shell data structure. The shell data structure detailed below is built and tested on various devices, OS versions and form-factors. Additionally, it can overcome the form-factor limitation if the HTML files are designed to be adaptive or responsive.

Further still, in situations where the content at issue is static and/or where a mirror website is used as a backup, some example embodiments of the native app described herein will still operate if the original website goes down or is not accessible (e.g., if the mobile computing device lacks a network connection when using the native app). Currently there are many website applications, including critical web applications in use by field operators such as emergency responders & mobile sales personnel which cannot be accessed without Internet connectivity via cellular or Wi-Fi signal. Many of these website applications can be converted into native apps using example embodiments described herein for a fraction of the time and expenses related to custom designing and coding app versions of those applications using an app programmer (or team of app programmers).

As mentioned, the website-to-native app conversion techniques described herein allow anyone to convert any static or dynamic website into a native app that works on any of a number of mobile computing device platforms, such as Android and iOS devices.

According to an example embodiment, the inventors disclose a method comprising a processor automatically converting a website into a native app, wherein the automatically converting step comprises (1) the processor generating a manifest data structure for the website to be converted, (2) the processor accessing a native app shell data structure in a memory, and (3) the processor compiling the native app from the native app shell data structure and the manifest data structure. The native app shell data structure can be configured to house the underlying logic for running the native app, presenting website content via the native app, navigating among the website content via the native app. The native app shell data structure may include code that configures the native app to operate according to a relinking model or an intercepting model. Furthermore, in a relinking model, the manifest data structure may take the form of a file that lists all assets of a website that are locally hosted by the native app. However, in an intercepting model, the manifest data structure may initially take the form of merely a specification of the website to be converted (e.g., a specification of the website's URL). Then, during later use of the app, such a manifest could be updated to list any website assets that are intercepted and locally cached by the native app. Examples of such designs are discussed below.

Further still, the native app shell data structure may be populated with features that are not available on the website to be converted. For example, the native app shell data structure may be configured to provide the native app with functionality that allows it to provide features such as push notifications, content searches, security, multi-lingual support, GPS-based locator services, camera capabilities and others.

These and other features and advantages of various embodiments of the invention will be described in greater detail below with reference to the accompanying drawings.

BRIEF DESCRIPTION OF THE DRAWINGS

FIG. 3 shows an example web foundry process flow.

FIGS. 4-11 show example GUIs for guiding a user through the process of converting a website into a native app according to an example embodiment.

FIG. 12 shows an example overview of how the web foundry and app foundry may interconnect with each other according to an example embodiment.

FIG. 13 shows an example of a crawler/scraper-based website-to-native app conversion.

FIG. 14 shows an example embodiment for an app foundry.

FIG. 15 shows an example of app info used for the conversion process.

FIG. 16 shows an example embodiment for a relinking app engine.

FIG. 17 shows an example process flow for an app internal update with a relinking model.

FIG. 18 shows an example process flow for an app external update with a relinking model.

FIG. 19 shows an example embodiment for an intercepting app engine.

FIG. 20 shows an example process flow for an app content update with an intercepting model.

FIG. 21 shows an example architecture for a native app including shell code, manifest and assets.

FIGS. 22A and B show examples of website asset relinking.

FIG. 23 shows an example manifest file.

FIG. 24 shows an example push notification process flow.

DETAILED DESCRIPTION OF EXAMPLE EMBODIMENTS

Figure 1A:
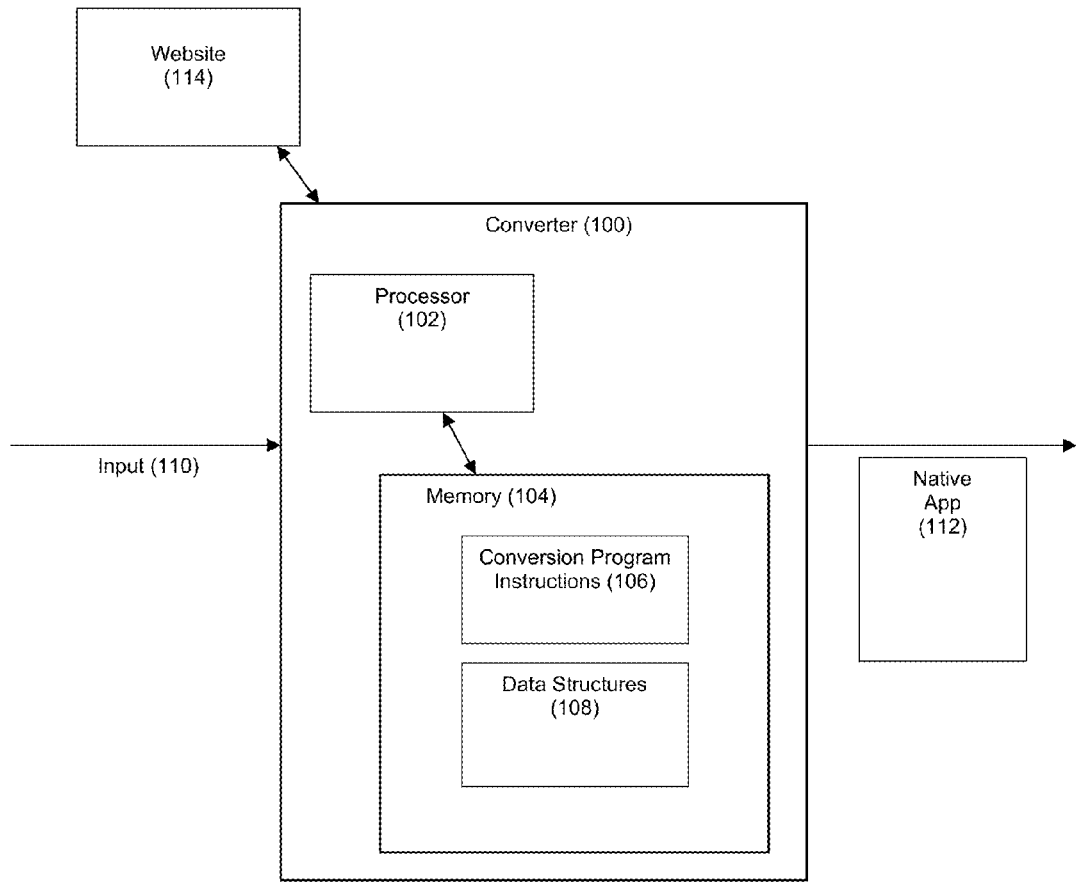
FIG. 1A shows an example embodiment of a computer system that is designed to convert a website into a native app.

FIG. 1A shows an example embodiment of a system that is designed to convert a website 114 into a native app 112. A converter 100 takes the form of a computer system comprising a processor 102 and a memory 104. The memory 104 can store conversion program instructions 106 and supporting data structures 108 as described herein. The processor 102, in response to input 110, executes the conversion program instructions 106 with the support of data structures 108 to generate a native app 112 from a specified website 114. As used herein, a data structure is a physical manifestation of information organized within a computing system. Examples of data structures may include data files, programs, instructions, scripts, records, tables, arrays, trees, objects, and the like.

The website 114 can be any website accessible over a network, and it need not be a website that is specially configured to work with any specific type of app or mobile computing device operating system platform. For example, the website 114 can be built using HTML, CSS (Style Sheets), JavaScript, customer plug-ins including third party script libraries such as jQuery, jQuery Mobile or Angular or other web programming languages. The website 114 comprises a collection of content components (e.g., web pages or portions thereof that can take the form of HTML files) as well as a collection of links to the various content components. The content components can be static content components or dynamic content components. The content components of the website and the links of the website can be referred to as the assets of the website.

The input 110 can take any of a number of forms. For example, the input 110 can simply be an identification of the website 114 to be converted, such as a specification of the uniform resource locator (URL) for the website. In an example embodiment, the converter computer system 100 can be configured to provide a series of graphical user interfaces (GUIs) to a user computer for display thereon, where these GUIs guide the user through the process of converting a website into a native app. One of these GUIs may include a data entry field that allows a user to enter the URL for the website 114 to be converted into the native app 112. The processor, upon execution of the conversion program instructions 106, can then access this specified website, crawl it, and extract the information needed to generate the native app 112, as described in greater detail below. As another example, the input 110 can be a copy of the website 114 itself. In an example embodiment, a user may compress the website 114 into a single file (e.g., a zip file) and send the compressed file to the converter computer system 100 where it is uncompressed for the converter computer system to gain access to the website 114. In another example embodiment, the converter computer system 100 may have an application programming interface (API) for interfacing with an external computer system so that the external computer system can deliver a copy of the website 114 to the converter computer system 100. The external computer system would have a capability to integrate this API into its own system so that users of the external computer system have easy access to the converter 100. In this regard, third party website building/publishing tools/services such as Wix, Squarespace, and/or Weebly would have a capability to provide their users with access to the converter 100 via an API so that such users can not only build their own websites but also automatically convert those websites into native apps as described herein. Further still, the input 110 may include metadata for the native app that is to be generated, such as an app icon to be displayed for the native app on a screen of a mobile computing device, a name for the native app, and the like.

Figure 1B:
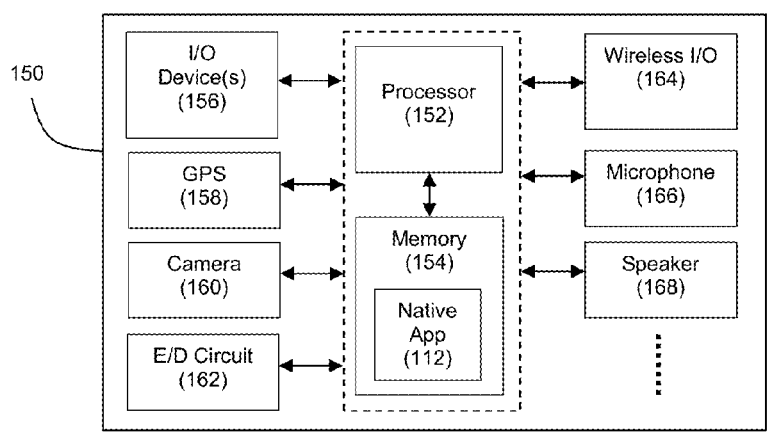
FIG. 1B shows an example embodiment of a mobile computing device configured for execution of a native app.

The native app 112 can take the form of a plurality of data structures and instructions that are executable by a processor of a mobile computing device to present the website 114 to a user of the mobile computing device via invocation of the native app 112. The native app 112 will be configured for execution by a specific mobile computing device operating system, such as Android, iOS, BlackBerry, or Windows. The native app 112 can be stored on a non-transitory computer-readable storage medium such as computer memory. For example, a copy of the native app 112 can be stored in a memory of an app store or the like and be made available for download into the memory of a mobile computing device for execution thereby. FIG. 1B shows an example mobile computing device 150 that is configured to execute native app 112. The mobile computing device 150 includes a processor 152 and associated memory 154, where the processor 152 and memory 154 are configured to cooperate to execute the native app 112. Furthermore, the mobile computing device 150 may also include one or more I/O devices 156 (e.g., a touchscreen user interface for graphically displaying output data and receiving input data from a user), a GPS receiver component 158, a camera 160 capable of capturing video, an encryption/decryption circuit 162 for encrypting or decrypting data, wireless I/O 164 for sending and receiving data, a microphone 166 for capturing sound, and a speaker 168 for converting sound data into audible sound. The wireless I/O 164 may include capabilities for sending and receiving messages over a network such as a cellular data or WiFi network as well as making and taking telephone calls. The wireless I/O may also be capable of communicating with nearby objects via near field communication (NFC), communicating with nearby objects via RF, and/or communicating with nearby objects via Bluetooth. As explained below, the native app 112 may be configured to interface with these components of a mobile computing device in order to provide users with increased functionality relative to the capabilities of the source website 114.

Returning to FIG. 1A, the processor 102 can take the form of any hardware data processing component that is capable of performing the website-to-native app conversion operations as described herein. For example, the processor 102 may take the form of a microprocessor, CPU, or the like that is capable of executing the conversion program instructions 106. In operation, such a processor 102 can fetch one or more conversion program instructions 106 from memory 104 over a bus or other interconnect for execution thereby. It should be understood that the processor 102 may take the form of multiple processors that cooperate with each other to implement the website-to-native app conversion operations as described herein.

The memory 104 can take the form of any memory device capable of storing data and interacting with the processor 102 as described herein. It should be understood that the memory 104 may take the form of multiple memory devices. Together, the processor 102 and memory 104 as described herein can be characterized as a circuit specially configured to perform website-to-native app conversion operations as described herein.

The converter computer system 100 may also include, by way of example, additional components such as non-volatile data storage (e.g., a hard disk, etc.) connected to a bus, one or more network interfaces connected to the bus, through which the computer system 100 can receive input and or website content from remote sources via a network, a display (e.g., a monitor) and input(s) (e.g., a keyboard, mouse, etc.) for interacting with users.

Example embodiments of the conversion program instructions 106 and data structures 108 are described below. Instructions 106 are configured for execution by processor 102 and can be stored on a non-transitory computer-readable storage medium such as memory 104. Examples of different embodiments for the conversion program instructions 106 and data structures 108 are described below in connection with a locally hosted web site embodiment and a link interception embodiment for the native app 112. With the locally hosted website embodiment for the native app 112, the native app 112 is built so that some or all of the website's content components are locally hosted by the native app 112 from inception, in which case the native app can function effectively even if the mobile computing device on which it executes lacks a network connection. The link hosting embodiment can be referred to as employing a crawling/relinking method to build the native app. With the link interception embodiment for the native app 112, the native app 112 is built so that it accesses the website over a network connection available to the mobile computing device when the native app is launched. Website content then gets served from the remote website while also being cached by the native app. Subsequent usage of the native app to access the same web site content may result in the content being served from the local cache rather than the remote website.

Figure 2:
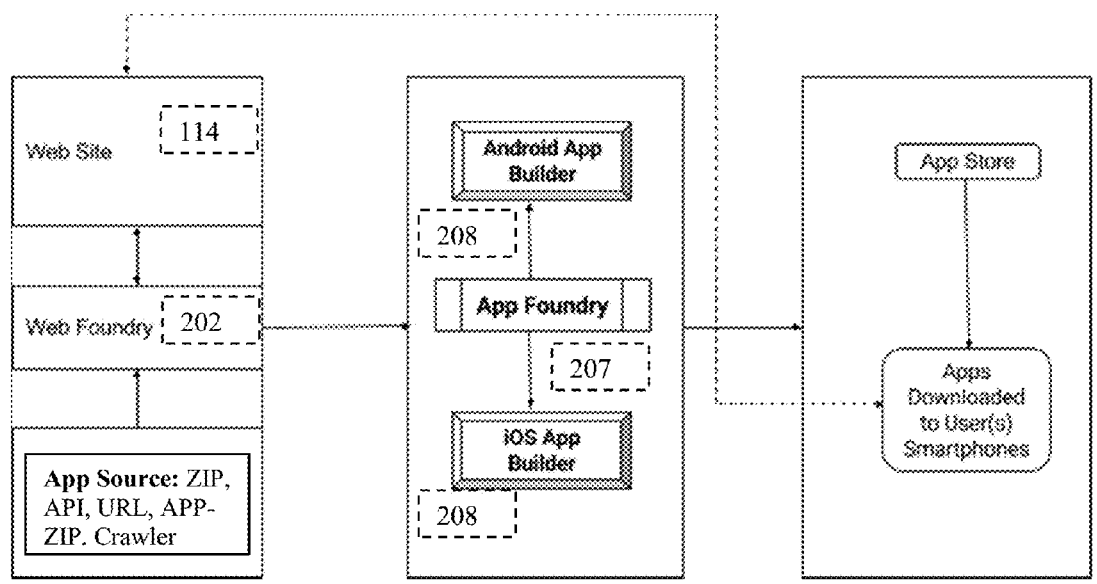
FIG. 2 shows an example embodiment of an overview for website-to-native app conversion.

FIG. 2 shows an example embodiment of an overview for website-to-native app conversion. In the example of FIG. 2, the conversion program instructions 106 may include a web foundry 202 and an app foundry 207, where the app foundry 207 may include platform-specific app builders 208 (e.g., an Android app builder and an iOS app builder). The web foundry 202 is configured to interact with a website 114 according to an app source method as discussed below to identify website components and develop a set of website assets to be included in the native app. The app foundry 207 is configured to build the native app using the website assets provided by the web foundry 202. The resulting native app 112 can then be provided to a user and/or uploaded to an app store to be made available to users.

A. Web Foundry

Flow to Convert a Website into a Native App

FIG. 3 shows an overview of the user interface flow for converting a website in a native app. This example flow has five primary steps—

1. Collect website and owner data
2. Customize app features
3. Integrate marketplace features
4. App Store meta-data collection
5. Push data to app builder to convert website into a native app.

Collect Website and App Owner Info

FIG. 4 shows an example GUI through which users are prompted for their email address and the website address for the website to be converted into a native app. The Create button invokes step 1 of Web Foundry to processes the given URL and sends it to next step, Crawl.

Processing App (Crawl, Relink, Download Assets.)

FIG. 5 shows an example GUI that includes an animated interface that explains what the system is doing while the conversion program instructions operate to, for an example embodiment where crawling is employed, crawl the website data, relink the assets and files, and download the assets of the website.

App Features

FIG. 6 shows an example GUI that allow app owners to add additional features and customize and personalize their app. For example, features to integrate the native app with various social media services may be provided.

Marketplace Integration

FIG. 7 shows an example GUI that allows users to select from an additional list of features that can be incorporated into the native app. Examples of such additional features may include Security, Private App, Offline App, Push Notification, as discussed below.

App Branding

FIG. 8 shows an example GUI that allows users to upload an app icon and its splash image for the native app as per app store specifications.

Native App Store Info (Metadata)

FIG. 9 shows an example GUI that allows users to upload information about their app as per the appropriate app store specifications. The App Builder will use such metadata when building the app.

Preview and Validate

FIG. 10 is an example GUI that shows a simulated preview of the app, with the ability to rotate and/or set orientation. Users can also test their push notification and offline functionality in this mode. The Validate module verifies if all links are accurately set.

App Build

The system next collates the metadata from the previous steps and passes it to the app builder. Once the builder and app engine completes the build, the apps are emailed to the user with instructions on how to submit to Apple and Google (see FIG. 11).

A(1): App Sources

The web foundry 202 can accept website content in any one of a number of formats as discussed above and as described in more detail below. For example, FIG. 12 shows an example where any of five techniques can be used to accept website content to build a native app. Each of the input methods is detailed below.

App Source: Method 1: Crawler 209

Brief Overview:

A crawler on a server or the app is designed to download a given website content including HTML, CSS, JavaScript, images and other assets 1201 that makes up the website, parse that content and store the content in a local database in the server or within the app as a set of content component files. The system then processes 207 each file to relink the URLs inside it to point to the local file so the content loads from within the device instead of the external web server. This allows the website content to be viewed without a network connection and improve the app's performance. An example of a tool that can be used as the crawler is NCrawler available from ncrawler.codeplex.com.

The illustration in FIG. 13 depicts an example environment for the Crawler-based app conversion example embodiment.

Details:

1. Websites

Website 114 is created by a professional by designing and uploading the files to a web farm. This can be done by the user creating the files in a desktop editor then transferring the files to a server (web farm) via file transfer—or by using a website building/publishing tool service (Examples: Wix, Squarespace, and Weebly).

2. Web Foundry a. The web foundry 202 can be made up of multiple logic components that crawl or scrape the website content 1201, store that content in a database or some other storage medium. Other logic components of the web foundry can collect and validate app metadata 1203, including app name, description, icons, and other assets used to build the app by the App Foundry 207.

b. The process combined with a web service to transfer the assets to the App Foundry 207 to create the app.

3. App Foundry a. The App Foundry 207 may comprise two parts—an app builder 208 and an app engine 210. The app builder accepts input from the web foundry, parses the information and routes it to a platform-specific app builder 208.

b. The builders 208 can be platform-specific. Each builder takes an app shell (see FIG. 14, 1405) and injects the web content inside it to build a platform-specific Native App. For the locally hosting embodiment, the injected web content can be a locally hosted version of the website. For the link intercepting embodiment, the injected web content can take the form of a specification of the target website (e.g., its URL) (and where this web content grows in a local cache as the native app is used).

c. The native app 112 is then sent to the user to host in a public App Store (e.g., Apple's or Google's online stores for obtaining apps) or the system hosts the native app in a private app store and send the links to the user.

4. App Stores a. The user can then submit the native app 112 to the App Stores for approval.

b. Once approved, the apps are then ready to be purchased from the App Stores.

5. Updates a. In an example embodiment, the app 112 when invoked can be configured to check for updates from the live website when it is in use. This process can be made easy by allowing the app to communicate directly to a web service (examples for such updates are discussed below).

6. Refresh a. When checking for updates, the web service pings the website crawler or scraper (SQL database) (cont. to step 6b).

b. If the crawler or scraper finds new information, it scrapes the new content from website and updates the database and notifies the web service.

c. The web service then sends the updates to the mobile device running the app.

App Source: Method 2: Interception 205

Brief Overview

The web foundry 202, in an example embodiment, builds a platform-specific native shell app (see FIG. 14, 1405) with no pre-built content of the website beyond a capability to access and present a specified website for display. The native app, when invoked, loads the website 114 to display and intercepts the network calls to cache responses. If network connectivity is not available and if the previously cached objects are present, the cached responses are used to fulfill the requests to display the website.

Details

An example embodiment for the Interception-based website-to-native app conversion comprises a user (app owner) entering website address (URL) along with metadata about the app 1203 used to build the native application such as its icon, name, etc. that they want to convert into an native application.

This information is validated and then given to a processor or packager for each mobile platform desired. This process then uses the information to build a native application for the given website (URL). Once finished, the application is sent back to the website owner or submitted to the appropriate store (e.g. Apple App Store or Google Play or Private App Store) for distribution.

App Source: Method 3—AppPackage 206

Brief Overview

A special custom platform-specific native application is used to browse a website 114, intercepting the network calls and caching the responses similar to the Interception method detailed above and below. The cached responses are then uploaded to the web foundry 202 along with app metadata including icons, description, images and other information used to build the app. Both these information sets are packaged and sent to app foundry 207 to build the platform-specific native application. Updates to that application could also be done using the same special application for initial creation. These processes would may involve uploading the cached responses to a server for the building of the application.

Details

An example embodiment for the AppPackage-based website-to-native app conversion comprises of using a special native application to browse a website 114 and then using the cache from browsing to create the final application.

A special native application is used to browse a target website 114. In a fashion similar to the Interception method, the requests for resources needed to display the website are recorded and saved into a cache. Once the website has been browsed enough to have a sufficient portion of the needed assets 1201 for display of the website, the application can upload its cache to a server to have the final application built.

This server receives the cached files 1201 from the special application and combines this with other necessary app metadata 1203 used to compile a native application. The final native application is then built with the assets needed for displaying the target website.

The final native application when launched will display the website 114 using the assets 1201 captured by the original special application. It could also make requests directly to the website 114 and even update the cache similar to the Interception method.

Another way to update the content is to use the special application to browse/update the cache for the website 114 and upload the new content to the server to build a new updated version of the final application.

App Source: Method 4—ZIP 203

Brief Overview

The user zips the content of the website 114 and uploads the zipped content to the web foundry 202 along with app metadata 1203 including icon, name, version and other information used to build the platform-specific native app with content from the zip file. The native app can be designed and built to exhibit behavior the same as or similar to the native app built using the Crawler or Interception or AppPackage models.

Details

An example embodiment for the Zip-based website-to-native app conversion comprises a user uploading the contents of the website 114 in a compressed Zip format to the web foundry 202. The compressed file can contain app metadata 1203 including icon, name, version and other information used to build the platform-specific native app The web foundry 202 decompresses the files and splits the website content 1201 from app metadata 1203 and sends it to the app foundry 207 to build the platform-specific native app for displaying the target website 114.

The native application when launched will display the website using the assets 1201 captured by the original zip file provided by the user. It could also make requests directly to the website 114 and even update the cache similar to the Interception method.

App Source: Method 5—API 204

Brief Overview

The user makes a request from their website to an API (application programming interface) service passing in the URL of the website 114 and along with app metadata 1203 including icon, name, version and other information used to build the platform-specific native app along with security keys to uniquely identify the source. The web foundry 202 then parses the information and calls the app foundry 207 to build the platform-specific native app. When the process is complete, the app foundry can email the app or link to the app to the user for distribution.

Details

An example embodiment for the API-based website-to-native app conversion comprises a user calling a set of API calls over the network from their website passing in the address for website 114, assets 1201 and other information used to build the platform-specific native app. To ensure security, each caller may pass-in a pre-assigned security key to uniquely identify their website and ownership.

The web foundry 202 verifies the data along with security key to ensure identity matches and sends the info to app foundry 207 to build the platform-specific native app for displaying the target website 114.

The native app can be designed and built to exhibit behavior the same as or similar to the native app built using the Crawler or Interception or AppPackage models.

B. App Foundry

With reference to FIGS. 13 and 14, the App Foundry 207 may comprise two parts: the App Builder 208 and the App Engine 1301. The App Engine 1301, its produced manifest (see FIG. 14, 1401) and output assets (see FIG. 14, 1402), and Shell app code (see FIG. 14, 1405) can be designed to vary slightly between the Crawling/Relinking and Interception models, and of course the resulting platform-specific native app file 112 would differ because of the differing code used to compile. The App Builder 208 would likely not need to change as a function of the target platform if desired by a practitioner.

In an example embodiment, the App Builder 208, its subcomponents 1403, the Shell App code 1405, and the App Info 1203 would vary depending on the platform (e.g. Android, iOS) which would also cause the produced platform-specific native app file 112 to vary as well. Other portions of the foundry 207 would not likely be required to change because of the platform if desired by a practitioner.

The App Foundry 207 receives platform-specific and app-specific data, App Info 1203, the input assets 1201 and associated file mapping 1202; the latter two are sent to the App Engine 1301. The produced manifest file 1401 and output assets 1402 along with the App Info 1203 are then sent to one or more platform-specific App Builders 208 which use the appropriate shell code 1405 for the platform and model (Relinking or Interception) to produce the final platform-specific native app file(s) 112.

The input assets 1201 and file mapping 1202 may be empty or not given to the foundry 207. In this case, according to an example embodiment such as in an interception model embodiment, the only source of input can be the App Info 1203 as well as a specification of the website 114 (e.g., the URL for website 114). With no input for the App Engine 1301 it is effectively skipped and the App Builder 208 would only be given the App Info (1203) and website URL (which would serve as the manifest data structure) and use the appropriate Shell code 1405 for the interception model to produce the final platform-specific native app file(s) 112.

App Info

The App Info 1203 given to the App Foundry 207 can include information used to build/compile the application 112 such as the name, version, icon, unique identifier. An example of such app info is provided in FIG. 15. In this example, the app info 1203 is in an XML format, but it should be understood that other formats for storing and transferring the information could be used such as JSON.

App Builder

The App Builder component 208 is responsible for the actual compilation of the application, and would be specific to the platform being compiled (e.g. Android, iOS). The builder 208 (possibly) receives the processed/output assets 1402 and manifest 1401 of the target website 114. It uses platform-specific and app-specific information, App Info 1203 (such as the app's name, icon, version), and a platform-specific identifier (e.g. iOS Bundle Identifier). This information could come from the same source as the input assets 1201 or from another location (likely another website's form input).

This information is then used to setup a project 1404 such that it can be compiled 1403 with the appropriate Shell App code 1405. In an example embodiment, this setup process can vary for each platform such as the location where the packaged files 1401, 1402 are placed as well as the structure used to contain the metadata for the application (such as the name, version, and unique identifier). For example, Android-packaged resources would typically be placed in an 'assets' folder and the metadata in the 'AndroidManifest.xml' file. In contrast, iOS-packaged resources are typically in the top level folder of the project and referenced in the project file, while the metadata is stored in an 'Info.plist' file. While the 'AndroidManifest.xml' and 'Info.plist' files are typically in XML, the element and attribute names are vastly different.

The compilation step 1403 would typically use the standard compiler/tools for the platform, such as 'xcodebuild' for iOS or 'ant' (and related Java compilers) for Android. While these compilers have similarities they typically cannot take code written in a different language or for another platform, thus the compiler used is typically dependent on the platform being built.

The compilation process typically produces a single platform app file 112 (such as a .apk for Android, or .ipa for iOS). This file serves as the converted website application. This could then be used to install directly onto a device, or publish to an app store (e.g. Google Play, Apple App Store).

App Engine

As discussed above, the app engine according to example embodiments may be designed to employ either of two models—a relinking model and an intercepting model.

1. The Relinking model involves analyzing the content of the website and adjusting links (URLs) to load from the app's storage instead of directly from the website.
2. The Intercepting model instead captures the requests made to display the website and will replace them with responses in its cache, or update its cache if needed. It will also use these cached responses if the device loses its network connection.

Both variants of the engine may receive input asset files 1201 as well as a mapping 1202 of the addresses where the input asset files are retrieved and output a manifest 1401 (mapping a filename or path with the original address) as well as output asset files 1402 which are either very similar to the input asset files or in the case of the intercepting engine exactly the same. However, in some embodiments of the intercepting model, the engine may not need to start with any input asset file as the app according to the intercepting model may merely start with the website URL, as discussed below.

Other information is likely to be present in the manifest file 1401 such as the starting address/page to use when the app launches, the time the files were processed, and other metadata about the content of each file, etc. In the event a practitioner omits this extra information from the manifest 1401, it would still likely be desirable to package such additional information with the application 112 in some manner for efficient operation.

App Engine Architecture—Relinking Model:

FIG. 16 shows an example architecture and process flow for a relinking app engine 1301. The relinking app engine 1301 model takes input asset files 1201 (from one of the above methods or from updating described below) along with a mapping 1202 associating the files with their original address (URL).

A final Address to File mapping 1609 is created from merging and removing mappings 1604. Then each file from the input assets 1201 is processed 1605. Depending on the type of file, a different parser 1606 is used; for example HTML, CSS, and Javascript. Other parsers could be used as well, and would be necessary if another file type needs to be processed. Using the parser, links are found and each one is checked to see if it exists in the mapping 1609. If the link does exist, it is then adjusted/relinked 1607 to the local file instead of the website. Once all of the links for a file have been adjusted, it is saved 1608 to the output asset files 1402. Not all files need to be processed or parsed, such as images since they do not contain any links to other resources; these files would be left unaltered and saved in the output asset files 1402.

The address to file mapping 1609 is saved 1610 to make the final manifest file 1401 containing the mapping used and like metadata on each file such as HTTP headers, or metadata on the website or state of the application. This process could be performed before, during or after the processing of files 1605.

If the engine is updating existing assets, then the current manifest 1601 and current files 1602 are available as well as possibly a list of removed assets 1603. Before making the final Address to File mapping 1609 merging of the input mapping 1202 and the mapping present in the current manifest 1601 would take place. This merging 1604 would include adding entries in the input mapping 1202 that are not in the current manifest 1601, and updating the file path and/or metadata for entries present in both (and possibly deleting the old version of the file). If a list of removed resources 1603 is provided, these listed resources are then removed from the mapping (the associated file may also be deleted at this point or in the future). After these steps the final address to file mapping 1609 is formed. Also while updating the current asset files 1602 are also processed 1605 with the input assets 1201 in order to relink any new, updated, or deleted assets.

Relinking Model—App Content Update:

If desired by a practitioner, the native app 112 can be designed to check for updates to website 114 and then update itself accordingly. With such embodiments, the app content can be updated according to either of two different methods with the Relinking model, as shown by FIG. 17 (app internal update) and FIG. 18 (app external update).

Both update methods perform a check 1701, 1801 to see if any new or updated website content is available. These checks can be triggered by in several ways, such as the application 112 launching, periodically based on time, or externally by an API or webservice call (typically from the website owner).

If checking reveals that an update is available, the app user can be asked 1802 if they wish to update (as the process takes time and network resources, a user may or may not want to perform the update). The update process ensures the application 112 has the latest content for the website 114 available to it.

Option 1

App Internal Update

In this option, as shown by FIG. 17, the application processes 1702 each entry in the manifest 1401, 1601 and makes a request to the original server 1703 for the resource (e.g. using the HTTP HEAD method) and determines if received response is different/new 1704 from the one currently stored on the device. Each one determined to be different or new is added to a list 1705. Once all the entries in the manifest have been processed and there is at least one entry in the list 1706 (i.e. at least one resource has changed or updated) and update is determined to be available.

The actual update process begins and a full request 1708 (e.g. HTTP GET) for each resource 1707 in the list is made and the full response is then retrieved and placed into the New Input assets 1201 and its address (URL) and metadata are added to a mapping 1202. The Relinking App Engine (see FIG. 16) is then used to update the current assets 1402, 1602 and manifest 1401, 1601. Some resources may have been removed from the server (e.g. HTTP 404 status code), in which case the associated file is removed by adding it to a list of removed mappings 1603. Each of the resources 1401, 1402, 1601, 1602 are processed and then saved to the device completing the update process.

Option 2

App External Update

FIG. 18 shows an example process flow for an app external update. Similar to Option 1 (FIG. 17), the files 1705 are instead processed in the App Engine (see FIG. 16) on a server (not necessarily the website host). Advantages to this over option 1 typically include faster fetching of resources (as compared to the mobile device) and processing them faster (servers typically have more computing capability). This option also allows for refinement of the relinking process without needing to recompile the application and possibly submitting to that platform's store.

In this scenario, the app 112 checks if an update is available from this server 1801. If updates are available it may prompt the user 1802 if they wish to update as the process may take time to complete. Checking for updates would involve storing a unique sequence (e.g. timestamp or hash) of when all of the assets were last updated (or initially created) and comparing it to what the server has. When an update happens 1803, the server is contacted again 1804 for a list of files that each have a unique sequence (e.g. timestamp or hash). This list is compared with the application's manifest 1401. For each entry there are 3 possibilities:

1. New Resource—entry exists in server's list but not in the application's manifest
2. Updated Resource—entry has a different unique sequence between the server and application
3. Removed Resource—entry exists in the application's list but not in the server's manifest New and updated resources are downloaded 1805, 1806 from the server; since the Relinking process (FIG. 16) was done there, the device does not need to alter or adjust them. Then removed resources are deleted 1807 from the application 112, and finally the manifest file 1401 is updated to match the server including the unique sequence indicating when the last update occurred.

In this option, updates would only occur when the server (not necessarily the website host) is triggered to perform the relinking process on the website. Possible triggers include periodic (e.g. hourly or daily), or a webservice or API call from the website when it changes (or wants to publish such changes). This is in contrast to option 1 (FIG. 17) where the trigger is from the user of the application.

App Engine Architecture—Intercepting Model:

In the interception model, the App Engine 1301 is much simpler. FIG. 19 shows an example embodiment of an intercepting app engine 1301. The input assets 1201 are typically unchanged and passed directly as the output assets 1402. Only the manifest file 1401 would need to be generated 1901 from the mapping of the input files 1202. The process would involve serializing the mapping 1202 into the desired format and possibly adding any additional metadata.

The built application 112 when launched will load the specified website (URL) entered by the owner. While the application 112 is loading any web page, image, script, or other asset, the request 2002 is intercepted, allowing the application 112 to examine the request and give its own response 2008 instead of going to a server.

When a request is intercepted, the application determines 2003 if a cache entry exists in the manifest 1401. If a requested entry exists in the cache and is considered 'fresh' 2005 according to predetermined criteria (e.g. by the HTTP Caching standards), the cached file from the assets 1402 is served instead of making a network request. However if a 'stale' (not 'fresh') response is found and no network connectivity (2004) is available, the cached file could still be used.

If an entry does not exist for the request (or it is stale but a connection exists), then the website asset is fetched 2006 by normal means and the response and its content are added to the cache by updating the manifest 1401 and assets 1402 so that it can be used for this and later requests. Not all responses need be cached (nor should they), such as HTTP POST submissions.

The need to update the application 112 is minimal, and really occurs automatically as a user browses the website. However, updating a cached response is possible by having the application 112 forcibly make a network request for it and replacing or updating it with the network response in the manifest 1401 and assets 1402. This could be done, for example, on all cached responses or on responses that are considered 'stale.'

C. Shell App

The native app shell data structure can take the form of shell application code 1405. The shell code can include the basic logic for displaying the native app on the mobile computing device and interfacing with the mobile computing device's native controls and provides a simple user interface for browsing the website content from within the app and navigating that content from within the app. In an example embodiment, the shell code 1405 can also contain the logic for performing the App Content Update (see FIG. 17, FIG. 18, FIG. 20) of the App Engine 1301. The shell code 1405 can be configured to use the manifest 1401 and assets 1402 to display the converted website and behave appropriately.

In the relinking model, the Output Assets 1402 are modified versions of the Input Assets 1201, and in many cases the differences in the links are subtle, such as removing leading '/' characters to make them relative instead of absolute. The modified files 1402 are then loaded from local device storage to be displayed in the platform's native control, typically through use of the file:// protocol. Changing absolute links is done in the link remapping to prevent the files from trying to access the root directory of the device which an application normally does not have access to.

FIGS. 22A and B show examples of site and relinking outputs. When the original input asset (from the website) already has a relative link, it is normally not altered (ex: FIG. 22A in page1.html the link to page2.html is relative and not changed in the Relinked version). However, the naming scheme and hierarchy of the output assets does not have to match that of the input assets or the website. In this case all links that point to another asset would have to be changed to match the naming scheme used.

FIG. 23 shows an example manifest file 1401 for a relinking embodiment. The manifest file 1401 would primarily contain a mapping that associates the original address (URL) of the asset to the path of the local file that holds the corresponding output asset in addition to any metadata for the asset such as HTTP headers. Other information about the converted website would likely be present such as the original address (URL) that was converted, the date the manifest was created (or updated). While the example given here is in XML format, it should be understood that other file formats or data structures could be used such as a relational database.

The shell code 1405 for the interception model contains the logic outlined in the interception App Content Update (FIG. 20), a manifest 1401, and optionally prepackaged assets 1402. The manifest data structure 1401 in such an embodiment may simply be a specification of the URL for the website 114. However, as the intercepting native app 112 is later used, this manifest 1401 may grow to list the locally cached website assets. Also, the shell code 1405 for the interception model may initially not have an input assets, although these input assets can be built during app use as the app locally caches the website contents that are accessed.

Unlike the caching mechanisms of a typical browser, the shell app code for the intercepting model is designed to be aggressive in how it caches responses and override or ignore any pre-existing cache control configuration data that may be included within the website assets. For example, the cache logic of the shell code 1405 can be configured to cache HTTP responses even if those responses have headers stating they should not be cached. In these scenarios the cached response can be considered 'stale' within the app, and will always be fetched from server if connectivity exists. However, if connectivity does not exist, the application 112 will serve these 'stale' responses from the local cache, thereby providing the user with content even if connectivity is lost.

A conventional browser caching mechanism typically cannot be pre-populated with cached responses. Browsers will also typically not display a website page from cache if connectivity is lost, especially if the response is marked as not cacheable. Many websites will mark their main pages as not cacheable so that any updates are always fetched. The caching model of the intercepting app 112, however, allow a user to still browse the website 114 as they last saw it without any connectivity. Also, if assets 1402 are prepackaged into the application 112, they can browse that version without having any connectivity the first time the application 112 is opened.

Shell App Platform Differences

This section outlines some of the differences in the Shell App code 1405 between Android and iOS. Other differences would be present for other platforms such as Windows and Blackberry.

Determining connectivity 2004 for Android devices is performed much differently than for iOS devices. Android has a component called a Broadcast Receiver that can be notified when changes to network connectivity occur, including when it is lost, switching to or from WiFi, etc. Such a receiver is set up to monitor changes and keep a flag (boolean) updated when an internet connection is available or not.

For iOS, determining connectivity 2004 to the internet is not as straightforward. Instead network requests are always attempted and fall back to code handling non-connectivity if a timeout or other error indicating a loss of connection.

In the interception model, the actual mechanism of intercepting requests 2002 differs greatly as between an Android interception model and an iOS interception model. For Android, the native WebView control used to display the content allows for application code to give responses to resource requests of the control. Returning a null value will have the control perform the request normally over the network.

Interception on iOS involves the application registering a URL Protocol handler. This handler does not receive requests 2002 for just the native control display the website, but all network requests done by other parts of the application 112. Because of this, requesting the resource from the server 2006 to update the cache requires flagging said request so that it is not intercepted 2002 over and over. The application code for this handler is also not typically on the same thread of execution as the rest of the application, which causes concurrency issues with accessing and changing the same memory.

D. Marketplace Integrations

Additional features that can be included in the Website-to-Native App Conversion Process flow include integrating one or more marketplace features into the native app. Examples of options in this regard are described below. When such feature integrations are desired, code for implementing such additional features can be added to the shell app code 1405 so that the features can be executed by native app 112.

1. Security

Brief Overview

A website may or may not have security layer added to it. A typical security layer is a authentication security scheme. When the website is converted to an app, the current architecture can support the login authentication built into the website dynamically. By adding extra layer of security on top of the website's authentication security scheme, it adds an extra layer of protection to protect the data the app has stored in the local device.

Details

An example embodiment for this can include a two-step approach to adding the extra layer of protection on top of the already existing authentication.

Example: An insurance website that was converted to an app collects user data from a form. During app usage, connectivity is lost while data has been entered into the form via the app (in which case such data can be kept in local storage on the device). And at a later time when device re-establishes connectivity, the same data can be posted back to the server. During this transition time, absent additional security, there is a risk that if the device is lost or stolen, a person who finds or steals the device can read the data. By adding an extra layer of app level security, the data that is stored in the device will be in encrypted format and will be deemed unreadable. At the same time, when connection is reestablished, the app will post the data to the server in an unencrypted format but over a SSL layer.

Another example can be a case where a web-based chat application with no security cannot be used by a hospital staff due to HIPAA rules. The same web-based chat converted into an app and with the added app level security instantly becomes a HIPAA compliant app.

During the app build process, an app owner can choose to add extra security by configuring few additional steps (see the example GUIs described above). The UI process is extremely easy and intuitive that allows any non-technical person to add the industry standard security their app.

2. Private App Store

Brief Overview

By building an app that is deemed private (Example: a company wanting to convert their Human Resource website to track employee benefits into a native app will not serve any value if the app is hosted on the public app store, but it would be served well if it is built as a private app and hosted in a company-managed internal infrastructure.

Details

An example embodiment for this can include a one-click process for the app owner to choose to build, configure and send their completed app to a private app store and avoid the 14 days wait time to get their app published to an app store. The integrated process of this example embodiment takes minutes to build a private app with all features of the website and be ready to install on a device.

3. Push Notification

Brief Overview

Push Notifications are great tools for communication, but are not generally supported by websites. FIG. 24 shows an example process flow that can be used for the native apps 112 to support a push notification service.

Details

An example embodiment for this can include a one-click process the app owner can choose to configure and build their app 112 with Push notification enabled in it. The integrated process of this example embodiment takes minutes to build the app with Push Notification and avoid all the additional steps. The Push feature can be extended to support Group Push, Tagging based push, one-on-one push to target a specific user as well as users in certain geo location.

4. Multi-Lingual

Brief Overview

An app is by default designed to present information in a specific language. To serve content in different languages, the app developer would conventionally have to include a language translation feature, and each language the app supports can add complexity and time. However, this can be expedited by example embodiments where a multi-lingual feature can be easily integrated into app 112.

Details

An example embodiment for this can include a simple way for the app owner to build their app and choose to include additional languages using the marketplace add-on tools that example embodiments offer. The app shell can further make the user experience much easier by dynamically detecting which part of the world the device is located in and loading the local language translation service on the fly.

5. Search

Brief Overview

An app that serves multiple pages of content can use the marketplace tool or plugin to enhance itself to offer an integrated search of all the content using a simple user interface.

Details

An example embodiment for this can include a powerful feature the app owner can choose to add to their app and make their app content-searchable. Both in the crawler and interceptor model of the design, as the content gets gathered into the app and stored locally in the device, when user searches for one or more words, the app can scan through the locally stored pages and data and provide the results if designed to include a search feature.

6. Offline Data Collection and Upload to Server when Connection is Available Brief Overview A website that serves in an interactive nature which collects user information in a form type of page when converted to an app can work in offline mode without data connection and still deliver 100% of the functionality.

Details

An example embodiment for this can include a useful feature the app owner can choose to add to their app and make their app work in a disconnected or offline mode. Both in the crawler and interceptor model of the design, any page that collects data can detect if the device has connectivity or not and when there is no connectivity, the app can store the data in the local device storage. When the device regains connectivity, it can post the data back to the server and complete the transaction without any data or productivity loss.

7. Integrate Device-Specific Features into the App

An example embodiment for the integration of device-specific features into the native app can include a capability for an app owner can choose to integrate device-specific features such as Camera, Microphone, GPS etc. into the native app 112. As an example, a Tailor business can use their app to integrate Camera feature, and their customers can use the app to take photos of their suit or a gown and send it to the tailor all without leaving their app. The conventional approach would require the user to use multiple applications including Camera and Email separately to complete a transaction. However, with the integrated device feature, the end user can complete the same task in a much shorter time frame without leaving the app 112.

Other peripheral components of a mobile computing device that may be accessed through the native app can include a GPS receiver resident on the mobile computing device, a microphone resident on the mobile computing device, a Bluetooth component resident on the mobile computing device, a near field communication (NFC) component resident on the mobile computing device, a biometric sensor resident on the mobile computing device, an accelerometer resident on the mobile computing device, a compass resident on the mobile computing device, an altimeter resident on the mobile computing device, and an encryption or decryption circuit resident on the mobile computing device.

8. Other Device Support

The existing Web Foundry and App Foundry can be extended to support other platforms including BlackBerry or Windows by a practitioner adding platform-specific libraries.

The embodiments disclosed herein were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A method comprising:
a processor automatically converting a website into a native app, wherein the website comprises a plurality of content components and a plurality of links to the content components, wherein the automatically converting step comprises:

a crawler parsing the website to extract (i) a plurality of the content components of the website and (ii) a plurality of the links of the website;

the processor writing a plurality of the extracted content components into a memory as a plurality of files to be locally hosted by the native app;

the processor remapping a plurality of the extracted links so that they link to the locally hosted files rather than the website content components;

the processor generating a manifest data structure for the website to be converted based on the remapped links;

the processor accessing a native app shell data structure in a memory;

the processor compiling the native app from the native app shell data structure, the manifest data structure, and the files to be locally hosted by the native app.

2. The method of claim 1 wherein the native app shell data structure comprises a plurality of instructions for execution by a processor of a mobile computing device, wherein the instructions are configured to cause a mobile computing device that executes the native app to:

check the website for changes in the content components or links of the website; and in response to detecting a change in the content components or links of the website, update the native app to reflect the detected change.

3. The method of claim 1 wherein the native app shell data structure comprises a plurality of instructions for execution by a processor of a mobile computing device, wherein the instructions are configured to cause a mobile computing device that executes the native app to:

check a web service for any updates to the website; and in response to the web service indicating there is an update to the website, receive from the web service an update to the native app corresponding to the update to the website.

4. The method of claim 1 wherein the content components of the website comprise a plurality of static content components and at least one dynamic content component;

wherein the writing step comprises the processor writing the static content components into a memory as a plurality of files to be locally hosted by the native app;

wherein the remapping step comprises the processor remapping the links to the static content components so that they link to the locally hosted files rather than the website content components; and wherein the native app shell data structure comprises a plurality of instructions for execution by a processor of a mobile computing device, wherein the instructions are configured to cause a mobile computing device that executes the native app to respond to a selection via the native app of a link to the at least one dynamic content component by sending a request for the dynamic content component to the website so that the request for the at least one dynamic content component can be served from the website for presentation to a user of the mobile computing device via the native app.

5. The method of claim 1 wherein the website comprises a plurality of content components and a plurality of links to the content components, and wherein the manifest data structure comprises a list of files corresponding to the content components and a mapping of links for the listed files.

6. The method of claim 1 wherein the native app is an Android native app.

7. The method of claim 1 wherein the native app is an iOS native app.

8. The method of claim 1 further comprising:

the processor receiving a specification of the website as an input; and the processor performing the automatically converting step in response to the received input.

9. The method of claim 1 wherein the native app shell data structure comprises a plurality of instructions for execution by a processor of a mobile computing device, wherein the instructions are configured to interface the native app with a peripheral component of the mobile computing device to provide a function for a user of the native app.

10. The method of claim 9 wherein the peripheral component comprises at least one member of the group consisting of a camera resident on the mobile computing device, a push notification component resident on the mobile computing device, a GPS receiver resident on the mobile computing device, a microphone resident on the mobile computing device, a Bluetooth component resident on the mobile computing device, a near field communication (NFC) component resident on the mobile computing device, a biometric sensor resident on the mobile computing device, an accelerometer resident on the mobile computing device, a compass resident on the mobile computing device, an altimeter resident on the mobile computing device, and an encryption or decryption circuit resident on the mobile computing device.

11. The method of claim 1 further comprising:

providing a series of GUIs through which a user specifies the website to be converted and metadata for the native app to be generated, and wherein the automatically converting step is performed in response to inputs received through the GUIs.

12. A method comprising:

a processor automatically converting a website into a native app, wherein the website comprises a plurality of content components and a plurality of links to the content components, wherein the automatically converting step comprises:

the processor generating a manifest data structure for the website to be converted;

the processor accessing a native app shell data structure in a memory, wherein the native app shell data structure comprises a plurality of instructions for execution by a processor of a mobile computing device, wherein the instructions are configured to cause a mobile computing device that executes the native app to:

access the website to present a plurality of the content components and a plurality of the links to the content components to a user of the mobile computing device via a user interface of the mobile computing device;

locally cache the presented content components on the mobile computing device independently of any cache configuration specifications that are included within the content components of the website; and intercept selections of the presented links so that the native app can serve a request corresponding to the intercepted link from the local cache if the content component corresponding to the intercepted link is present in the local cache, and if the request is not to be served from the local cache, the native app causes the mobile computing device to send a request for the content component corresponding to the intercepted link to the website; and the processor compiling the native app from the native app shell data structure and the manifest data structure.

13. The method of claim 12 wherein the native app is an Android native app.

14. The method of claim 12 wherein the native app is an iOS native app.

15. The method of claim 12 further comprising:
the processor receiving a specification of the website as an input; and
the processor performing the automatically converting step in response to the received input.

16. The method of claim 12 wherein the native app shell data structure comprises a plurality of instructions for execution by a processor of a mobile computing device, wherein the instructions are configured to interface the native app with a peripheral component of the mobile computing device to provide a function for a user of the native app.

17. The method of claim 16 wherein the peripheral component comprises at least one member of the group consisting of a camera resident on the mobile computing device, a push notification component resident on the mobile computing device, a GPS receiver resident on the mobile computing device, a microphone resident on the mobile computing device, a Bluetooth component resident on the mobile computing device, a near field communication (NFC) component resident on the mobile computing device, a biometric sensor resident on the mobile computing device, an accelerometer resident on the mobile computing device, a compass resident on the mobile computing device, an altimeter resident on the mobile computing device, and an encryption or decryption circuit resident on the mobile computing device.

18. The method of claim 12 wherein the manifest data structure comprises a specification of a URL for the website.

19. The method of claim 12 further comprising:
providing a series of GUIs through which a user specifies the website to be converted and metadata for the native app to be generated, and wherein the automatically converting step is performed in response to inputs received through the GUIs.

20. A computer program product for converting a website into a native app, wherein the website comprises a plurality of content components and a plurality of links to the content components, the computer program product comprising:
a plurality of processor-executable instructions resident on a non-transitory computer-readable storage medium, and wherein the instructions are configured to cause a computer, upon execution of the instructions, to:
crawl the website to parse the website and extract (i) a plurality of the content components of the website and (ii) a plurality of the links of the website;
write a plurality of the extracted content components into a memory as a plurality of files to be locally hosted by the native app;
remap a plurality of the extracted links so that they link to the locally hosted files rather than the website content components;
generate a manifest data structure for the website based on the remapped links;
access a native app shell data structure in a memory, and
compile the native app from the native shell data structure, the manifest data structure, and the files to be locally hosted by the native app to thereby automatically convert the website into the native app.

21. The computer program product of claim 20 wherein the native app shell data structure comprises a plurality of instructions for execution by a processor of a mobile computing device, wherein the native app shell data structure instructions are configured to cause a mobile computing device that executes the native app to:
check the website for changes in the content components or links of the website; and
in response to detecting a change in the content components or links of the website, update the native app to reflect the detected change.

22. The computer program product of claim 20 wherein the native app shell data structure comprises a plurality of instructions for execution by a processor of a mobile computing device, wherein the native app shell data structure instructions are configured to cause a mobile computing device that executes the native app to:
check a web service for any updates to the website; and
in response to the web service indicating there is an update to the website, receive from the web service an update to the native app corresponding to the update to the website.

23. The computer program product of claim 20 wherein the content components of the website comprise a plurality of static content components and at least one dynamic content component;
wherein the write instructions are configured to cause a computer, upon execution of the write instructions, to write the static content components into a memory as a plurality of files to be locally hosted by the native app;
wherein the remap instructions are configured to cause a computer, upon execution of the write instructions, to remap the links to the static content components so that they link to the locally hosted files rather than the website content components; and
wherein the native app shell data structure comprises a plurality of instructions for execution by a processor of a mobile computing device, wherein the native app shell data structure instructions are configured to cause a mobile computing device that executes the native app to respond to a selection via the native app of a link to the at least one dynamic content component by sending a request for the dynamic content component to the website so that the request for the at least one dynamic content component can be served from the website for presentation to a user of the mobile computing device via the native app.

24. The computer program product of claim 20 wherein the native app shell data structure comprises a plurality of instructions for execution by a processor of a mobile computing device, wherein the native app shell data structure instructions are configured to interface the native app with a peripheral component of the mobile computing device to provide a function for a user of the native app, wherein the peripheral component comprises at least one member of the group consisting of a camera resident on the mobile computing device, a push notification component resident on the mobile computing device, a GPS receiver resident on the mobile computing device, a microphone resident on the mobile computing device, a Bluetooth component resident on the mobile computing device, a near field communication (NFC) component resident on the mobile computing device, a biometric sensor resident on the mobile computing device, an accelerometer resident on the mobile computing device, a compass resident on the mobile computing device, an altimeter resident on the mobile computing device, and an encryption or decryption circuit resident on the mobile computing device.

25. A computer program product for converting a website into a native app, wherein the website comprises a plurality of content components and a plurality of links to the content components, the computer program product comprising:

a plurality of processor-executable instructions resident on a non-transitory computer-readable storage medium, the instructions configured to cause a computer, upon execution of the instructions, to:

generate a manifest data structure for a website to be converted into a native app;

access a native app shell data structure in a memory, wherein the native app shell data structure comprises a plurality of instructions for execution by a processor of a mobile computing device, wherein the native app shell data structure instructions are configured to cause a mobile computing device that executes the native app to:

access the website to present a plurality of the content components and a plurality of the links to the content components to a user of the mobile computing device via a user interface of the mobile computing device;

locally cache the presented content components on the mobile computing device independently of any cache configuration specifications that are included within the content components of the website; and intercept selections of the presented links so that the native app can serve a request corresponding to the intercepted link from the local cache if the content component corresponding to the intercepted link is present in the local cache, and if the request is not to be served from the local cache, the native app causes the mobile computing device to send a request for the content component corresponding to the intercepted link to the website; and compile the native app from the native app shell data structure and the manifest data structure to thereby automatically convert the website into the native app.

26. The computer program product of claim 25 wherein the native app is an Android native app.

27. The computer program product of claim 25 wherein the native app is an iOS native app.

28. The computer program product of claim 25 wherein the native app shell data structure instructions are further configured to cause a mobile computing device that executes the native app to interface the native app with a peripheral component of the mobile computing device to provide a function for a user of the native app.

29. The computer program product of claim 28 wherein the peripheral component comprises at least one member of the group consisting of a camera resident on the mobile computing device, a push notification component resident on the mobile computing device, a GPS receiver resident on the mobile computing device, a microphone resident on the mobile computing device, a Bluetooth component resident on the mobile computing device, a near field communication (NFC) component resident on the mobile computing device, a biometric sensor resident on the mobile computing device, an accelerometer resident on the mobile computing device, a compass resident on the mobile computing device, an altimeter resident on the mobile computing device, and an encryption or decryption circuit resident on the mobile computing device.

30. The computer program product of claim 25 wherein the manifest data structure comprises a specification of a URL for the website.

* * * * *